United States Patent
Pinkerton et al.

(10) Patent No.: US 7,199,498 B2
(45) Date of Patent: Apr. 3, 2007

(54) ELECTRICAL ASSEMBLIES USING MOLECULAR-SCALE ELECTRICALLY CONDUCTIVE AND MECHANICALLY FLEXIBLE BEAMS AND METHODS FOR APPLICATION OF SAME

(75) Inventors: Joseph F. Pinkerton, Austin, TX (US); John C. Harlan, Leander, TX (US)

(73) Assignee: Ambient Systems, Inc., Austin, TX (US)

( * ) Notice: Subject to any disclaimer, the term of this patent is extended or adjusted under 35 U.S.C. 154(b) by 45 days.

(21) Appl. No.: 10/453,326

(22) Filed: Jun. 2, 2003

(65) Prior Publication Data

US 2004/0239210 A1 Dec. 2, 2004

(51) Int. Cl.
*H02K 3/00* (2006.01)
*H03H 9/24* (2006.01)

(52) U.S. Cl. .................. 310/152; 310/40 MM; 415/10; 977/725; 977/731; 977/838

(58) Field of Classification Search .............. 310/1, 310/10, 36, 40 MM, 152, 179; 417/410.1; 257/421, 415, 428, 433; 977/DIG. 1
See application file for complete search history.

(56) References Cited

U.S. PATENT DOCUMENTS

| 2,979,551 A | 4/1961 | Pack | 136/207 |
| 3,252,013 A | 5/1966 | Stanton | 307/132 R |

(Continued)

FOREIGN PATENT DOCUMENTS

| DE | 101 28 876 A | 11/2002 |
| EP | 0518283 | 12/1992 |
| EP | 0977345 | 2/2000 |
| JP | 02004516 | 1/1990 |
| WO | WO 01/03208 | 1/2001 |
| WO | WO 0120760 | 3/2001 |
| WO | WO 0193343 | 12/2001 |
| WO | WO 02/080360 | 10/2002 |
| WO | WO 03/001657 | 1/2003 |
| WO | WO 03/021613 A | 3/2003 |
| WO | WO 03/078305 | 9/2003 |

OTHER PUBLICATIONS

"Maximizing Power Generation in and Distributing Force Amongst Piezoceramic Layers", U.S. Appl. No. 10/785,289, filed Feb. 23, 2004, Mullen.*
"Maximizing Power Generation in and Distributing Force Amongst Piezoceramic Layers", U.S. Appl. No. 60/449,371, filed Feb. 21, 2003, Mullen.*

(Continued)

*Primary Examiner*—Karl Tamai
(74) *Attorney, Agent, or Firm*—Fish & Neave IP Gorup of Ropes & Gray LLP; Robert W. Morris; Jeffrey Q. Mullen

(57) ABSTRACT

Electromechanical systems utilizing suspended conducting nanometer-scale beams are provided and may be used in applications, such as, motors, generators, pumps, fans, compressors, propulsion systems, transmitters, receivers, heat engines, heat pumps, magnetic field sensors, kinetic energy storage devices and accelerometers. Such nanometer-scale beams may be provided as, for example, single molecules, single crystal filaments, or nanotubes. When suspended by both ends, these nanometer-scale beams may be caused to rotate about their line of suspension, similar to the motion of a jumprope (or a rotating whip), via electromagnetic or electrostatic forces.

This motion may be used, for example, to accelerate molecules of a working substance in a preferred direction, generate electricity from the motion of a working substance molecules, or generate electromagnetic signals. Means of transmitting and controlling currents through these beams are also described.

55 Claims, 32 Drawing Sheets

U.S. PATENT DOCUMENTS

| | | | | |
|---|---|---|---|---|
| 3,365,653 | A | 1/1968 | Gabor et al. | 322/2 R |
| 3,495,101 | A | 2/1970 | Slonneger | 310/306 |
| 3,500,451 | A | 3/1970 | Yandon | 310/330 |
| 3,508,089 | A | 4/1970 | Cheshire | 310/306 |
| 3,609,593 | A | 9/1971 | Boll et al. | 331/156 |
| 4,152,537 | A | 5/1979 | Hansch | 136/208 |
| 4,387,318 | A | 6/1983 | Kolm | 310/330 |
| 4,536,674 | A | 8/1985 | Schmidt | 310/330 |
| 4,595,864 | A | 6/1986 | Stiefelmeyer et al. | 315/246 |
| 4,814,657 | A | 3/1989 | Yano et al. | 310/309 |
| 4,966,649 | A * | 10/1990 | Harada et al. | 438/53 |
| 5,065,085 | A | 11/1991 | Aspden et al. | 322/2 R |
| 5,132,934 | A | 7/1992 | Quate et al. | 365/151 |
| 5,216,631 | A | 6/1993 | Sliwa, Jr. | 365/174 |
| 5,578,976 | A | 11/1996 | Yao | 333/262 |
| 5,619,061 | A | 4/1997 | Goldsmith et al. | 257/528 |
| 5,621,258 | A * | 4/1997 | Stevenson | 310/1 |
| 5,638,946 | A | 6/1997 | Zavracky | 361/234 |
| 5,649,454 | A | 7/1997 | Midha et al. | 74/520 |
| 5,677,823 | A | 10/1997 | Smith | 369/126 |
| 5,768,192 | A | 6/1998 | Eitan | 365/185.24 |
| 5,780,727 | A | 7/1998 | Gimzewski et al. | 73/105 |
| 5,835,477 | A | 11/1998 | Binnig et al. | 257/415 |
| 5,964,242 | A | 10/1999 | Slocum | 137/240 |
| 6,011,725 | A | 1/2000 | Eitan | 365/185.33 |
| 6,054,745 | A | 4/2000 | Nakos et al. | 257/415 |
| 6,069,540 | A | 5/2000 | Berenz et al. | 333/101 |
| 6,073,484 | A | 6/2000 | Miller et al. | 73/105 |
| 6,114,620 | A | 9/2000 | Zuppero et al. | 136/253 |
| 6,123,819 | A | 9/2000 | Peeters | 204/403 |
| 6,127,744 | A | 10/2000 | Streeter et al. | 307/125 |
| 6,127,765 | A | 10/2000 | Fushinobu | 310/306 |
| 6,157,042 | A | 12/2000 | Dodd | 257/21 |
| 6,160,230 | A | 12/2000 | McMillan et al. | 200/181 |
| 6,256,767 | B1 | 7/2001 | Kuekes et al. | 716/9 |
| 6,261,469 | B1 | 7/2001 | Zakhidov et al. | 216/56 |
| 6,300,756 | B2 | 10/2001 | Sturm et al. | 324/109 |
| 6,327,909 | B1 | 12/2001 | Hung et al. | 73/514.16 |
| 6,424,079 | B1 | 7/2002 | Carroll | 310/339 |
| 6,433,543 | B1 | 8/2002 | Shahinpoor et al. | 324/244.1 |
| 6,445,006 | B1 | 9/2002 | Brandes et al. | 257/76 |
| 6,445,109 | B2 | 9/2002 | Per.cedilla.in et al. | 310/324 |
| 6,509,605 | B1 | 1/2003 | Smith | 257/316 |
| 6,515,339 | B2 | 2/2003 | Shin et al. | 257/368 |
| 6,528,785 | B1 | 3/2003 | Nakayama et al. | 250/306 |
| 6,548,841 | B2 | 4/2003 | Frazier et al. | 257/254 |
| 6,559,550 | B2 | 5/2003 | Herman | 210/1 R |
| 6,574,130 | B2 | 6/2003 | Segal et al. | 365/129 |
| 6,593,666 | B1 * | 7/2003 | Pinkerton | 290/1 R |
| 6,593,731 | B1 | 7/2003 | Roukes et al. | 324/207.2 |
| 6,597,048 | B1 | 7/2003 | Kan | |
| 6,611,033 | B2 | 8/2003 | Hsu et al. | 257/414 |
| 6,643,165 | B2 | 11/2003 | Segal et al. | 365/151 |
| 6,653,547 | B2 | 11/2003 | Akamatsu | 136/205 |
| 6,669,256 | B2 * | 12/2003 | Nakayama et al. | 294/99.1 |
| 6,672,925 | B2 * | 1/2004 | Talin et al. | 445/49 |
| 6,674,932 | B1 * | 1/2004 | Zhang et al. | 385/16 |
| 6,685,810 | B2 | 2/2004 | Noca et al. | 204/450 |
| 6,730,370 | B1 | 5/2004 | Olafsson | 427/596 |
| 6,756,795 | B2 | 6/2004 | Hunt et al. | 324/701 |
| 6,762,116 | B1 | 7/2004 | Skidmore | 438/598 |
| 6,774,533 | B2 | 8/2004 | Fujita et al. | 310/309 |
| 6,803,840 | B2 * | 10/2004 | Hunt et al. | 333/186 |
| 6,805,390 | B2 | 10/2004 | Nakayama et al. | 294/99.1 |
| 6,806,624 | B2 | 10/2004 | Lee et al. | 310/339 |
| 6,828,800 | B2 | 12/2004 | Reich | 324/658 |
| 6,846,682 | B2 * | 1/2005 | Heath et al. | 438/2 |
| 6,882,051 | B2 | 4/2005 | Majumdar et al. | 257/746 |
| 6,911,682 | B2 | 6/2005 | Rueckes et al. | 257/202 |
| 6,914,329 | B1 | 7/2005 | Lee et al. | 257/712 |
| 6,953,977 | B2 | 10/2005 | Mlcak et al. | 257/414 |
| 2002/0024099 | A1 | 2/2002 | Watanabe et al. | 257/368 |
| 2002/0039620 | A1 | 4/2002 | Shahinpoor et al. | 427/2.12 |
| 2002/0043895 | A1 | 4/2002 | Richards et al. | 310/328 |
| 2002/0167374 | A1 | 11/2002 | Hunt et al. | 333/186 |
| 2002/0175408 | A1 | 11/2002 | Majumdar et al. | 257/734 |
| 2002/0180306 | A1 | 12/2002 | Hunt et a. | 310/302 |
| 2003/0033876 | A1 * | 2/2003 | Roukes et al. | 73/580 |
| 2003/0036332 | A1 | 2/2003 | Talin | 445/24 |
| 2003/0172726 | A1 | 9/2003 | Yasutake et al. | 73/105 |
| 2003/0175161 | A1 | 9/2003 | Gabriel et al. | 422/90 |
| 2004/0012062 | A1 | 1/2004 | Miyajima et al. | 257/419 |
| 2004/0157304 | A1 * | 8/2004 | Guo | 435/183 |
| 2004/0239210 | A1 * | 12/2004 | Pinkerton et al. | 310/309 |
| 2004/0240252 | A1 * | 12/2004 | Pinkerton et al. | 365/151 |
| 2005/0037547 | A1 | 2/2005 | Berlin et al. | 438/142 |
| 2005/0104085 | A1 | 5/2005 | Pinkerton et al. | 257/183 |
| 2005/0179399 | A1 | 8/2005 | Pinkerton et al. | 310/309 |

OTHER PUBLICATIONS

"Carbon Nanotube Actuators", Baughman et al, Science, May 21, 1999, Issue 5418, vol. 284, pp. 1240–1344.*

"Fabrication of High Frequency Nanometer Scale Mechanical Resonators from bulk Si Crystals", Cleland et al., Appl. Phys. Lett. 69 (18), Oct. 28, 1996.*

Database Inspec Online!, Institute of Electrical Engineers, Stevenage, GB; Ponomarenko et al. "Properties of boron carbon nanotubes: density–functional–based tight–binding calculations," Database accession No, 7588110, XP002278946, abstract Physical Review B (Condensed Matter and Material Physics), vol. 67, No. 12, pp. 125401–1–5, Mar. 15, 2003.

Sung et al. "Well–aligned carbon nitride nanotubes synthesized in anodic alumina by electron cyclotron resonance chemical vapor deposition," Applied Physics Letters, vol. 74, No. 2, pp. 197–199, Jan. 11, 1999.

Rueckes et al, "Carbon nanotube–based nonvolatile random access memory for molecular computing," Science, vol. 289 (Jul. 7, 2000), pp. 94–97.

Halg, Beat, "On a micro–electro–mechanical non volatile memory cell," IEEE Trans., Electron Devices, vol. 37, No. 10 (Oct. 1990) pp. 2230–2236.

Halliday et al.; "Physics. Third Edition"; John Wiley & Sons, Inc.; Jan. 1978; pp. 529–531.

Dresselhaus et al.; "Carbon Nanotubes; Synthesis, Structure, Properties, and Applications"; Springer–Verlag Berlin Heidelberg Jan. 2001; pp. 198–199, 292–293.

Kinaret J.M. et al. "A Carbon–Nanotube–Based Nanorelay", Applied Physics Letters, American Institute of Physics, New York, USA, vol. 8, No. 8, pp. 1287–1289, Feb. 24, 2003.

* cited by examiner

ELECTRICAL ASSEMBLIES USING MOLECULAR-SCALE ELECTRICALLY CONDUCTIVE AND MECHANICALLY FLEXIBLE BEAMS AND METHODS FOR APPLICATION OF SAME

BACKGROUND OF THE INVENTION

This invention relates to micrometer scale and nanometer-scale electromechanical assemblies and systems. In particular, the present invention relates to electromechanical assemblies based on suspended nanotubes or other molecular-scale electrically conductive and mechanically flexible wires. These assemblies may be used in a variety of systems for applications, such as motors, generators, pumps, fans, compressors, propulsion systems, transmitters, receivers, heat engines, heat pumps, magnetic field sensors, magnetic field generators, inertial energy storage and acoustic energy conversion.

Molecular wires, such as carbon nanotubes, can now be assembled and grown into structures. However, current nanometer and micrometer structures provide limited functionality. It is therefore desirable to provide nanometer-scale and micrometer scale electromechanical structures that can utilized in a wide variety of applications.

As the use of electronic devices continues to flourish, there is an ever increasing need to provide more efficient and/or quieter ways to cool the components that are typically the heart of such devices. For example, most personal computers include one or more fans that are required to maintain the temperature of the microprocessor within a certain operational range. These fans are often noisy, and often result in large quantities of dirty air being pulled through the computer from the air intakes.

Furthermore, conventional vacuum pumps and heat engines generally have a large number of moving parts that wear with use. These vacuum pumps and heat engines are also fabricated on the meter to micro-meter scale. It is therefore desirable to provide low wear pumps and engines that can be fabricated on the nanometer-scale.

SUMMARY OF THE INVENTION

It is an object of the present invention to provide molecular structures that can be utilized as, for example, motors, generators, pumps, fans, compressors, propulsion systems, transmitters, receivers, heat engines, heat pumps, magnetic field sensors, magnetic field generators, inertial energy storage and acoustic energy conversion.

The nanometer-scale assemblies of the present invention preferably utilize suspended nanotubes, or nano-wires, such as tubular carbon fullerenes, as an electromechanical element. These suspended nanotubes may be attached at both ends, similar to a transmission line or jump-rope, or they may be attached at one end only, like a cantilevered rod. These nanotubes can be coupled electromagnetically by suspending them in a magnetic field. As a result, electrical currents in the nanotube may interact with the magnetic field. Alternately, these nanotubes can be coupled electrostatically by suspending them near conductive surfaces, plates or pads. Thus, electrical charges on the nanotube may interact with charges present on nearby conductive surfaces through electrostatic forces.

An electromagnetically coupled assembly may include a nanotube which is suspended at both ends and immersed in a magnetic field. The nanotube may be grown or assembled such that the nanotube is suspended between two electrical connections. By applying a pulsed DC or AC current through the nanotube, the suspended nanotube can be caused to oscillate like a jumprope, spinning around a line drawn between two anchor locations at the two electrical connections. The motion of the nanotube can be used as mechanical energy for a variety of applications. Conversely, a moving suspended nanotube immersed in a magnetic field will generate currents in the nanotube, which can be collected and utilized by electronic circuits attached to said nanotube.

An electrostatically coupled assembly may include a nanotube that is suspended near one or more plates, pads or surfaces, where these surfaces are electrically isolated from said nanotube. The nanotube may be included in the assembly, for example, such that the nanotube is suspended between two electrical connections or attached at one end only to an electrical connection. By applying appropriate voltages to the nearby plates and the nanotube, electrostatic forces can be applied to the nanotube. In this manner, the suspended nanotube which is attached on both ends can be caused to oscillate like a jumprope, spinning around a line drawn between two anchor locations at the two electrical connections. A nanotube which is attached at one end only can be caused to whip in a spinning motion around the line normal to the connection point. The motion of this nanotube can be used as mechanical energy for a variety of applications. Conversely, a moving nanotube will generate voltage fluctuations in the nearby plates because of changes in the capacitive coupling, which can be utilized and collected by electronic circuitry.

The nanometer-scale electromechanical assemblies of the present invention may be constructed to convert electrical energy into mechanical energy, such that the mechanical energy can be applied at a molecular scale. This mechanical energy can be used to drive molecules in a fluid, such as a liquid or gas, to provide a molecular scale pump, fan, compressor or propulsion system. Further, a plurality or array of these assemblies may be used to affect said fluid at a macroscopic level, in systems such as cooling fans, pumps, compressors or propulsion devices. These systems can be incorporated as components of larger systems, such as a compressor in a heat engine. Alternatively, said nanotube assemblies may be used as a motor, in which said mechanical energy is used to directly impart motion to other molecules which are part of a larger microelectromechanical (MEM) device.

The nanometer-scale electromechanical assemblies of the present invention may be constructed to convert mechanical energy to electrical energy, such that said electrical energy may be used for other purposes. This electrical energy can be generated using the mechanical energy supplied by the motion of molecules in a fluid, such as a liquid or gas, to provide a molecular scale turbine generator, wind generator or heat pump. Further, a plurality or array of these assemblies may be used to provide electrical energy at a macroscopic scale. These systems can be incorporated as components of larger systems, such as a turbo-generator in a heat engine. Alternatively, said nanotube assemblies may be coupled to other molecules in a larger microelectromechanical (MEM) device, such that it can be used as a generator or alternator driven by the motion of molecules in said MEM device.

The nanometer-scale assemblies may be arranged within a chamber and utilized to control the flow of a working substance, such as a gas or other fluid, down a desired path through the chamber. The current applied to the nanotubes, or the timing of charges applied to plates, may be reversed to change the direction of the spinning nanotube and, as a result, pull the working substance in the opposite direction. The nanotube assemblies may include an array of transistors that are utilized in routing the current to the nanotubes for electromagnetically coupled assemblies, or are utilized in routing the application of voltage to nearby plates for electrostatically coupled assemblies.

Each of the nanotubes may be mounted within a trough such that half of the circumference of rotation of the nanotube occurs within the trough and half within the chamber. This provides an efficient mechanism for the working fluid to be smoothly transported from one side to the other. This type of assembly may be used in a variety of different applications, such as, for example, a vacuum pump, cooling fan, compressor, propulsion system, or any other device that benefits from moving a working substance in a desired direction.

Other applications of assemblies of the present invention may include, for example, a nanometer-scale jet engine for propulsion applications or a nanometer-scale heat engine for power conversion. In such a system, a central chamber would be used in conjunction with multiple nanotube assemblies. One or more of the nanotube assemblies may be included in a channel connected to the central chamber on one side, while a second set of nanotube assemblies is present in a channel connected to the central chamber at the other side. Gas, such as air, which may be used as the working substance, is compressed by action of the nanotube assemblies in the channel leading into the central chamber. Once there, the gas is heated by some thermal source and ejected into the other channel containing nanotube assemblies, with said second assembly of nanotubes acting as a turbine or expander. The nanotubes in the assembly that act as the input to the chamber act as motors or compressors, while the nanotubes in the expander assembly operate as generators or turbines, producing a net increase in power output due to the heat input into the central chamber, in the manner of a jet engine or a turbine power generator.

Assemblies of the present invention can also respond to changes in the electromagnetic conditions in the environment. Accordingly, it is a further object of the present invention to provide nanotube electromechanical assemblies that can be used as sensors for magnetic field or as antenna for sensing electromagnetic transmissions.

Assemblies of the present invention can also respond to changes in the mechanical conditions in the environment. Accordingly, it is a further object of the present invention to provide nanotube electromechanical assemblies that can generate electrical energy from the motion provided by ambient acoustic vibrations or ambient motion of other molecules in the environment, either through direct collision or other mechanical energy transmission means.

Assemblies of the present invention can create changes in the electromagnetic conditions in the environment. Accordingly, it is a further object of the present invention to provide nanotube electromechanical assemblies that can be used as magnetic field generators or as antenna for transmitting electromagnetic radiation.

Assemblies of the present invention can also store energy in the inertia of the molecular-scale wire, such as a flywheel would in a macroscale energy storage device. Accordingly, it is a further object of the present invention to provide nanotube electromechanical assemblies that can be used as inertial energy storage devices. These molecular flywheels, coupled either electromagnetically or electrostatically consistent with the above descriptions, can be either driven as a motor to increase the inertial energy storage or used as a generator to discharge said energy as electrical power.

BRIEF DESCRIPTION OF THE DRAWINGS

The above assemblies of the invention, and systems and constructs enabling methods for application of said invention, and advantages of the present invention shall be apparent upon consideration of the following description, taken in accordance with accompanying drawings, in which like reference characters refer to like parts throughout, and in which.

DETAILED DESCRIPTION OF THE DRAWINGS

Figure 1:
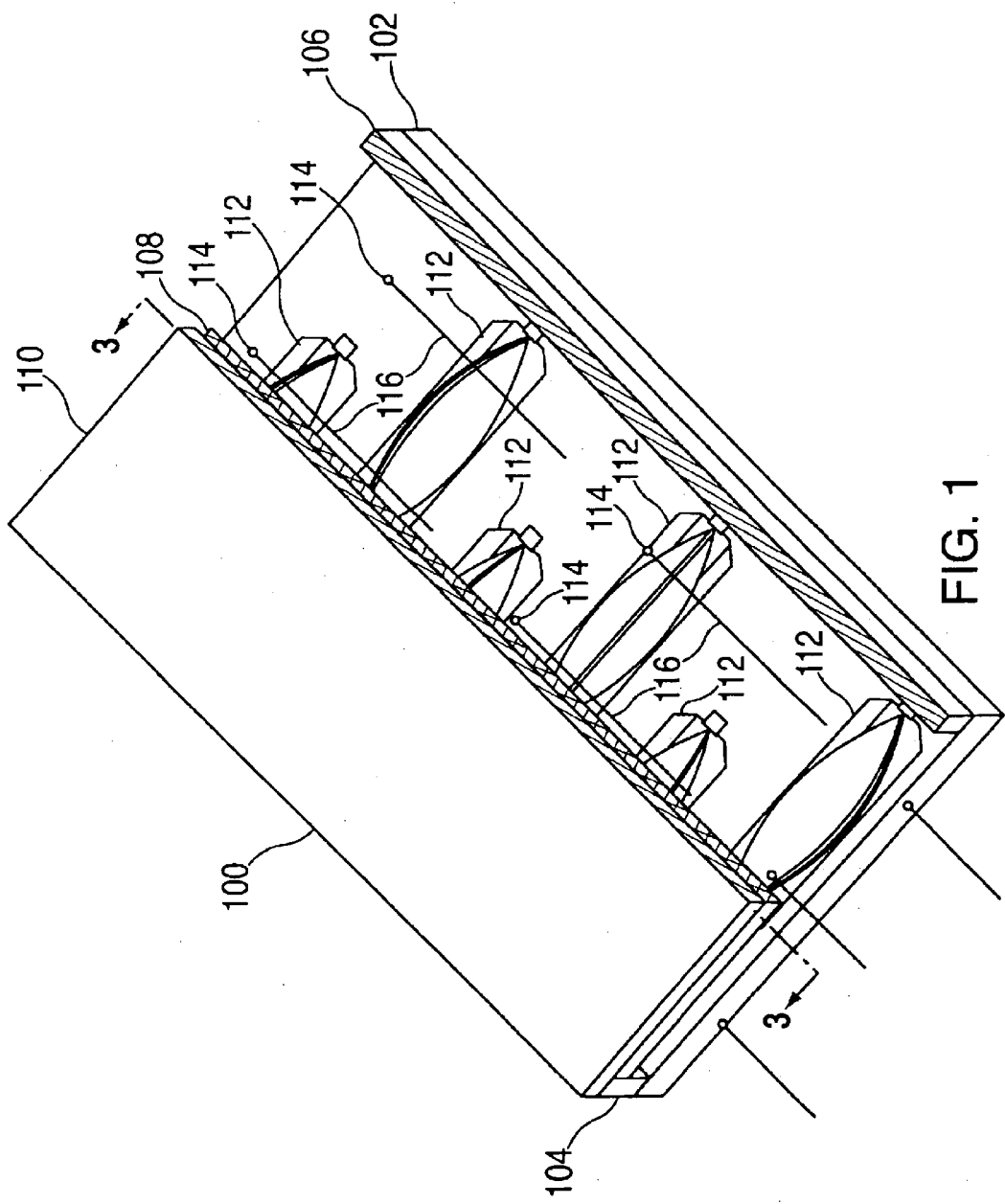
FIG. 1 is a perspective, partial-sectional view of a nanotube electromechanical system constructed in accordance with the present invention.

FIG. 1 shows a portion of a nanotube electromechanical assembly 100 constructed in accordance with the principles of the present invention. The portion shown in FIG. 1 includes a lower substrate base 102, channel side walls 104 and 106, permanent magnet 108, upper substrate 110 and six nanotube assemblies 112. Also shown in FIG. 1 are illustrations of molecules 114 that represent molecules of the working substance in which assembly 100 is immersed, as well as indicators 116 that show the path of molecules 114 through the channel side walls 104 and 106.

Figure 2:
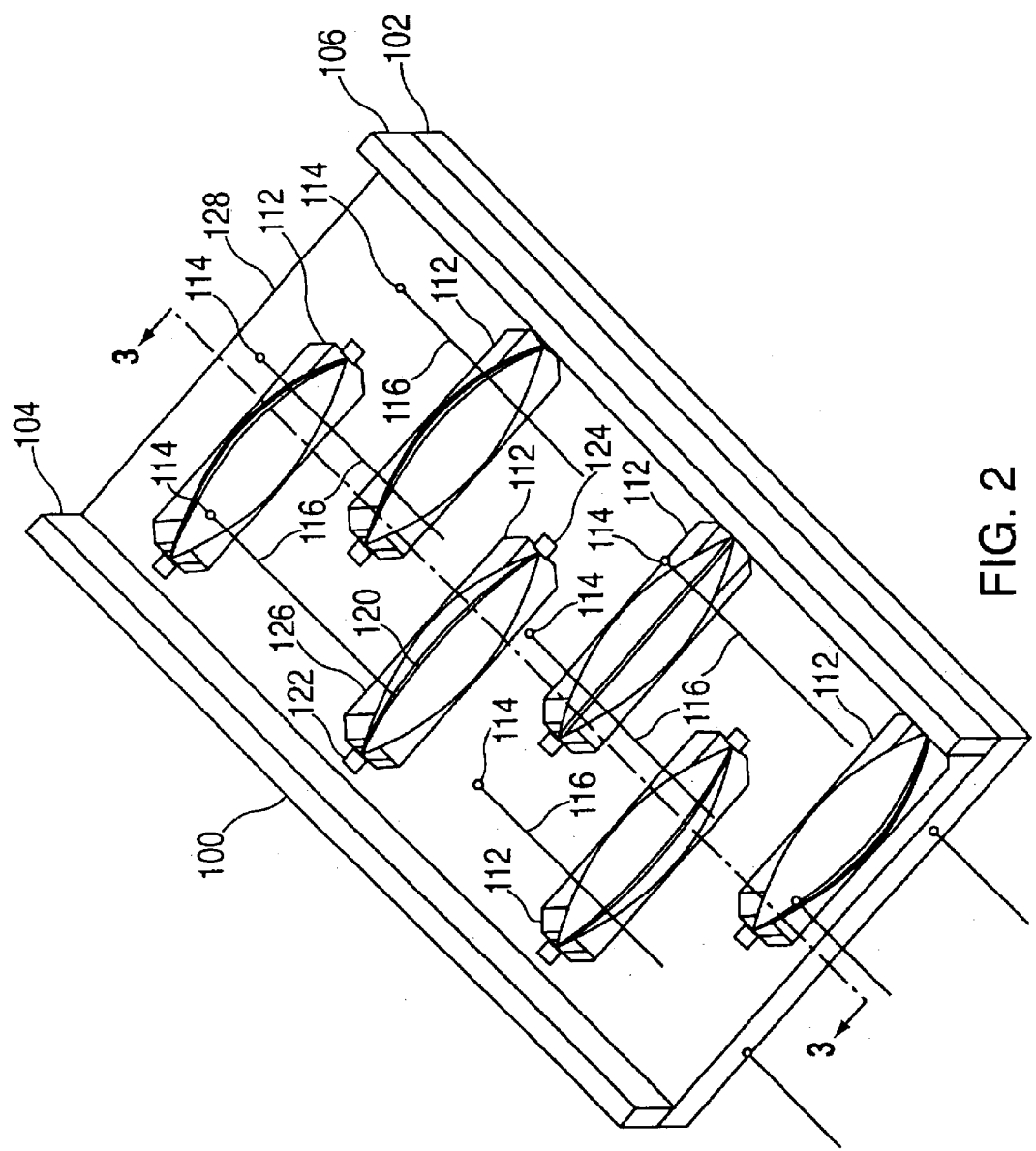
FIG. 2 is a perspective view of the portion of the nanotube electromechanical system of FIG. 1 in which the upper surfaces have been removed to expose the individual nanotube assemblies.

Each of the electromagnetically coupled nanotube assemblies 112 of the present invention includes several components that may be more readily appreciated from FIG. 2. FIG. 2 shows nanometer-scale assembly 100 of FIG. 1, except that upper substrate 110 and permanent magnet 108 have been removed. Each of nanotube assemblies 112 is formed from a nanotube 120, a pair of electrically conductive pads 122 and 124, and a trough 126. For clarity, only one of the six nanotube assemblies of FIG. 2 is labeled, however the description applies to each of them equally. Pads 122 and 124 are mounted to lower substrate 102, which is electrically insulating.

Figure 4:
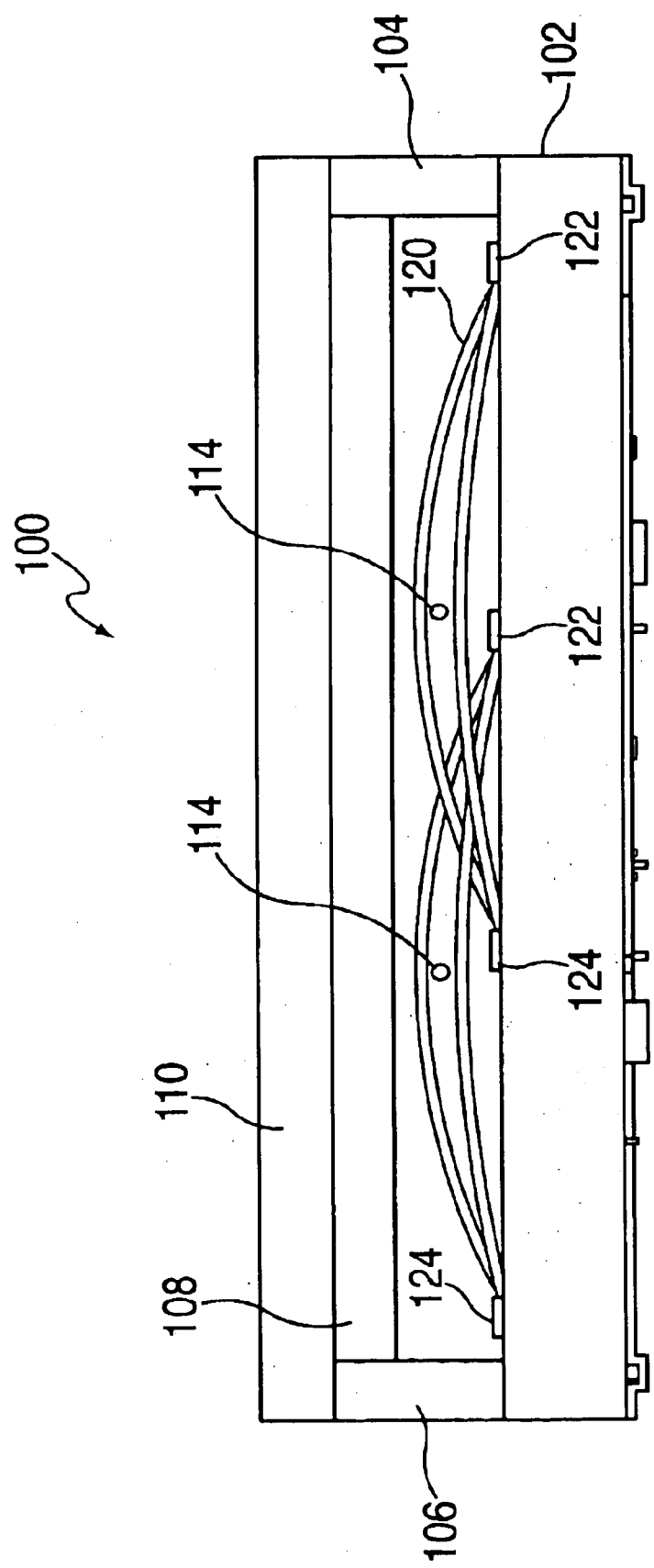
FIG. 4 is a plan view of the nanotube electromechanical system of FIGS. 1 and 2, as viewed from the exit of the chamber.

The nanotube assemblies 112 of this invention may be arranged within the chamber in any manner for application in this system or other systems consistent with this invention. It may, however, be preferable to arrange the assemblies 112 in a staggered fashion, such as shown in FIG. 2, to increase the likelihood that molecules of the working substance (such as a gas, liquid or other fluid) are forced to travel from one end of the channel to the other. The advantage of this configuration is readily apparent from FIG. 4, which shows how the staggered configuration provides at least 60% coverage of the channel. Such a configuration would therefore necessarily increase the overall efficiency of the device in many applications. Thus, if the device were configured as either as a pump or as a generator, more energy would be transferred between the nanotubes and the working fluid with the staggered configuration than if the troughs 126 were in alignment with each other.

The ends of each nanotube 120 are mounted, respectively, to one of the pads 122 and 124. It may be preferable to include some slack in nanotube 120 so that it hangs like a jump rope (see, for example, FIGS. 1–4). Alternatively, it may be preferable to mount nanotube 120 across pads 122 and 124 such that there is some tension between pads 122 and 124, in which case, the device would take advantage of the vibration of the nanotube rather than the rotation, or would take advantage of a smaller rotational amplitude at a higher frequency than a nanotube with lower tension. Alternatively, it may be preferable to mount nanotube 120 across pads 122 and 124 such that one or more of said pads is on a flexible member, in which case, the ends of the nanotube would become drawn closer together as the tension in the nanotube is increased at high rotational speeds; thereby allowing higher amplitudes and higher energies that one could obtain using a nanotube which was mounted with no slack to rigidly positioned pads.

Each of nanotubes 120 may, for example, be constructed of a material such as carbon; an example being a single walled carbon nanotube (a tubular fullerene) having a diameter of approximately 1 to 20 nanometers and a length from 20 to hundreds of nanometers (persons skilled in the art will appreciate that the dimensions of nanotubes 120 may be varied without departing from the spirit of the present invention). One advantage using single walled carbon nanotubes for nanotubes 120 is that they are formed of a single molecule, therefore, they may be bent endlessly at will within dimensional limits without damaging them, and without losing a lot of energy to friction. A further advantage of using single walled carbon nanotubes for nanotubes 120 is that the tensile strength is very high, allowing high vibrational and rotational energies. Another further advantage of using single walled carbon nanotubes for nanotubes 120 is the high electrical conductivity of these nanotubes. Alternatively, each of members 120 may be another suitable structure which is not a single molecule, such as, but not limited to, a carbon filament, a multiwalled carbon nanotube, or simply an electrically conductive, flexible piece of wire. Alternatively, the nanotube may be any of many other suitable molecular structures, including, but not limited to, tubular boron carbide molecules, tubular carbon nitride molecules or a single crystal filament such as quartz. In addition, it may be preferable to bond other molecular structures at one or more points along the primary nanotube or molecular wire to increase the mass or the cross-sectional size of the rotating element.

Figure 3:
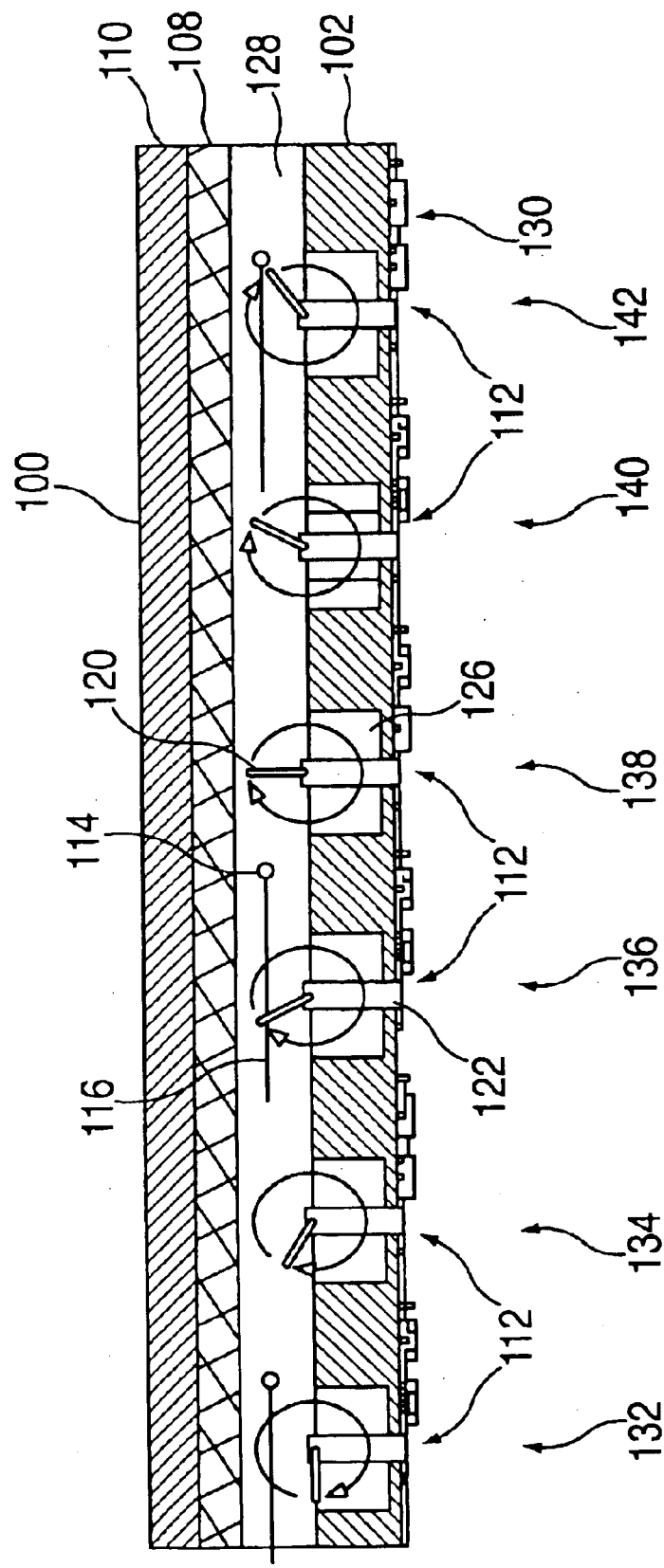
FIG. 3 is a cross-sectional plan view of the portion of the nanotube electromechanical system of FIGS. 1 and 2, taken along the line 3—3.

FIG. 3 shows a cross-sectional plan view of assembly 100 taken along line 3—3 of FIGS. 1 and 2. In addition to the components shown in FIGS. 1 and 2, FIG. 3 shows how the control/driver electronics 130 may be configured as essentially a bottom layer affixed to substrate 102. It should be noted that pads 122 and 124 (not shown in FIG. 3) extend from troughs 126 through substrate 102 to provide a direct electrical connection between electronics 130 and nanotubes 120. Similarly, for an electrostatically coupled embodiment of the present invention, similar electronics could be connected through the substrate to conductive plates or pads present in the walls or floor of the trough.

FIG. 3 is useful in illustrating the operation of assembly 100. During normal operation, assembly 100 is immersed in a working substance, such as a gas or other fluid, or said working substance is introduced into the central chamber via ducts, piping or other means. An external magnetic field is provided by permanent magnet 108. While a permanent magnet is shown as the source of the magnetic field, persons skilled in the art will appreciate that in this embodiment, as well as other embodiments herein, the external magnetic field may be provided by other sources besides a permanent magnet, such as electromagnetic field coils, or it may be generated locally for each suspended nanotube assembly by means such as other nanotube assemblies of this invention or other nanoscale magnetic field generators such as those in U.S. Pat. No. 6,157,042.

Control/driver electronics 130 provide pulsed DC or AC current to nanotubes 120, which cause the nanotubes 120 to rotate due to interactions between said current and the magnetic field. For example, FIG. 3 shows that all of the nanotubes are driven to rotate in a clockwise direction, which would thereby force the molecules of the working fluid to travel from left to right across FIG. 3, so that they exit the channel at end 128. For purposes of illustration, molecule 114 and indicator 116 are intended to show the present position of molecule 114 and the path 116 it has taken to reach that location. Similarly, for an electrostatic embodiment of the present invention, voltages applied to plates or pads located in one or more of the sides of the trough may be sequenced using the control/driver electronics to obtain essentially identical rotational motion from each of the nanotube assemblies.

When nanotubes 120 are single walled carbon nanotubes, they may be rotated at speeds of up to several gigahertz, because these molecules are so small, light and strong. The velocity of the nanotubes 120 at their maximum radius may be on the order of several thousand meters per second, which may accelerate the molecules of the working substance up to around mach 5. Such speeds may be particularly useful if assembly 100 is configured as, for example, a vacuum pump, fan, compressor or propulsion system. Other molecular tubes, rods or wires may have similar strength and so would allow high velocities and high energy transfer.

Control/driver electronics 130 may also provide sequencing to the current pulses so that different nanotubes 120 are out of phase with each other, but are timed in a manner with respect to other nanotubes that is beneficial to the operation of the system, assembly 100 in this case. For example, FIG. 3 shows six nanotube assemblies 112, which have been labeled in even numbers from 132–142. Electronics 130 controls the timing of the current pulses so that none of the six nanotubes 120 is rotating at the same angle (i.e., out of phase with each other). FIG. 3 shows each of the six nanotubes in a position rotated thirty degrees out of phase from the neighboring nanotubes.

When viewed together, the six nanotubes of FIG. 3 are timed to maximize the force and momentum applied on the molecules of the working fluid. For example, nanotube 132 is rotated parallel to the surface of the channel within assembly 100. Nanotube 134 is beginning to push the molecules of the working fluid through the channel. Nanotube 136 is rotated an additional thirty degrees so that it does not act to block the incoming molecules and is timed to receive the molecules pushed by nanotube 134. Nanotubes 138, 140 and 142 are each rotated an additional thirty degrees, such that nanotube 142 is rotating back into trough 126 as the molecules of the working fluid exit from the end 128.

Figure 5:
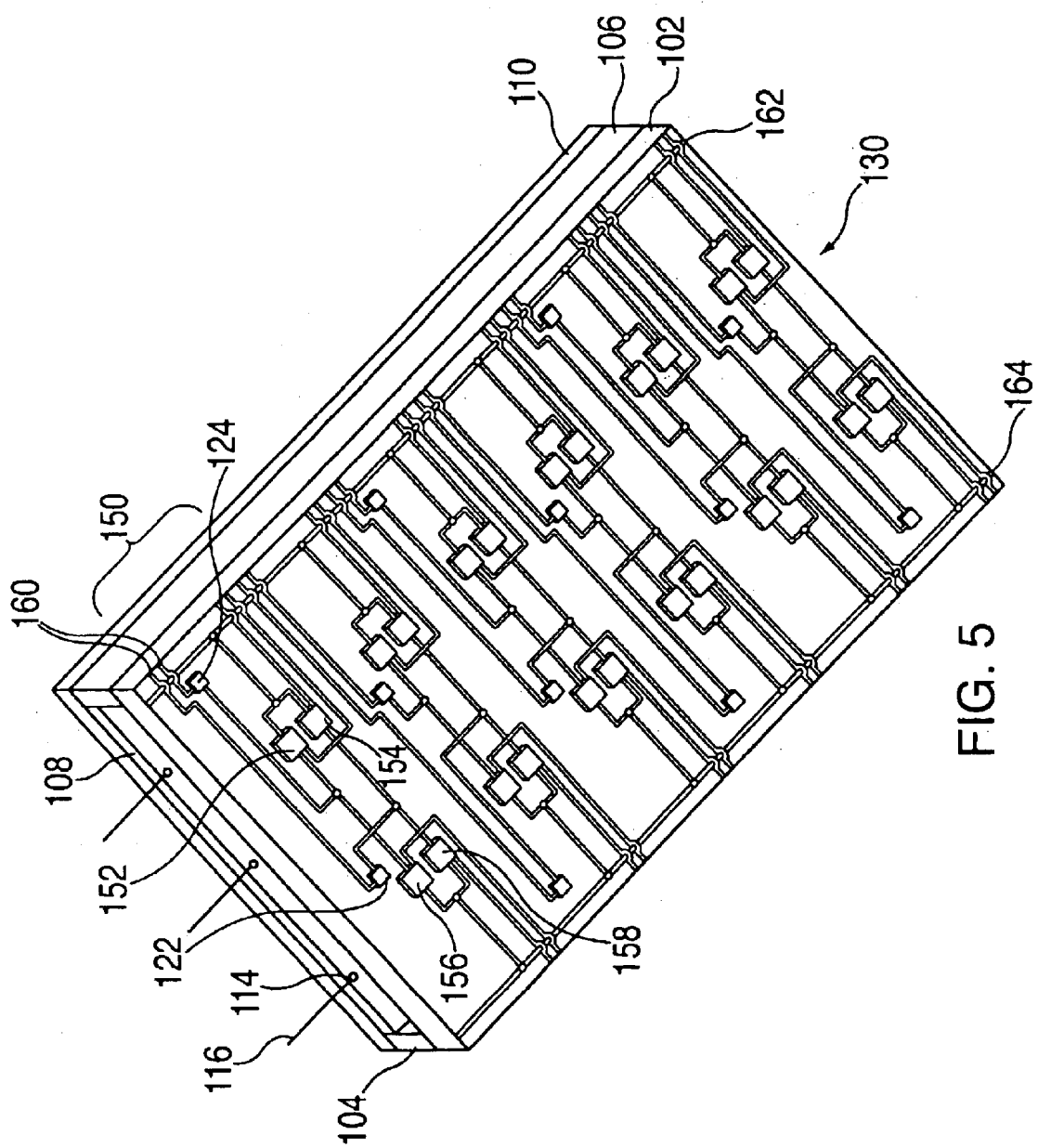
FIG. 5 is a three-dimensional, perspective view of the underside of the nanotube electromechanical system of FIGS. 1 and 2, which shows possible control/driver electronics.
Figure 6:
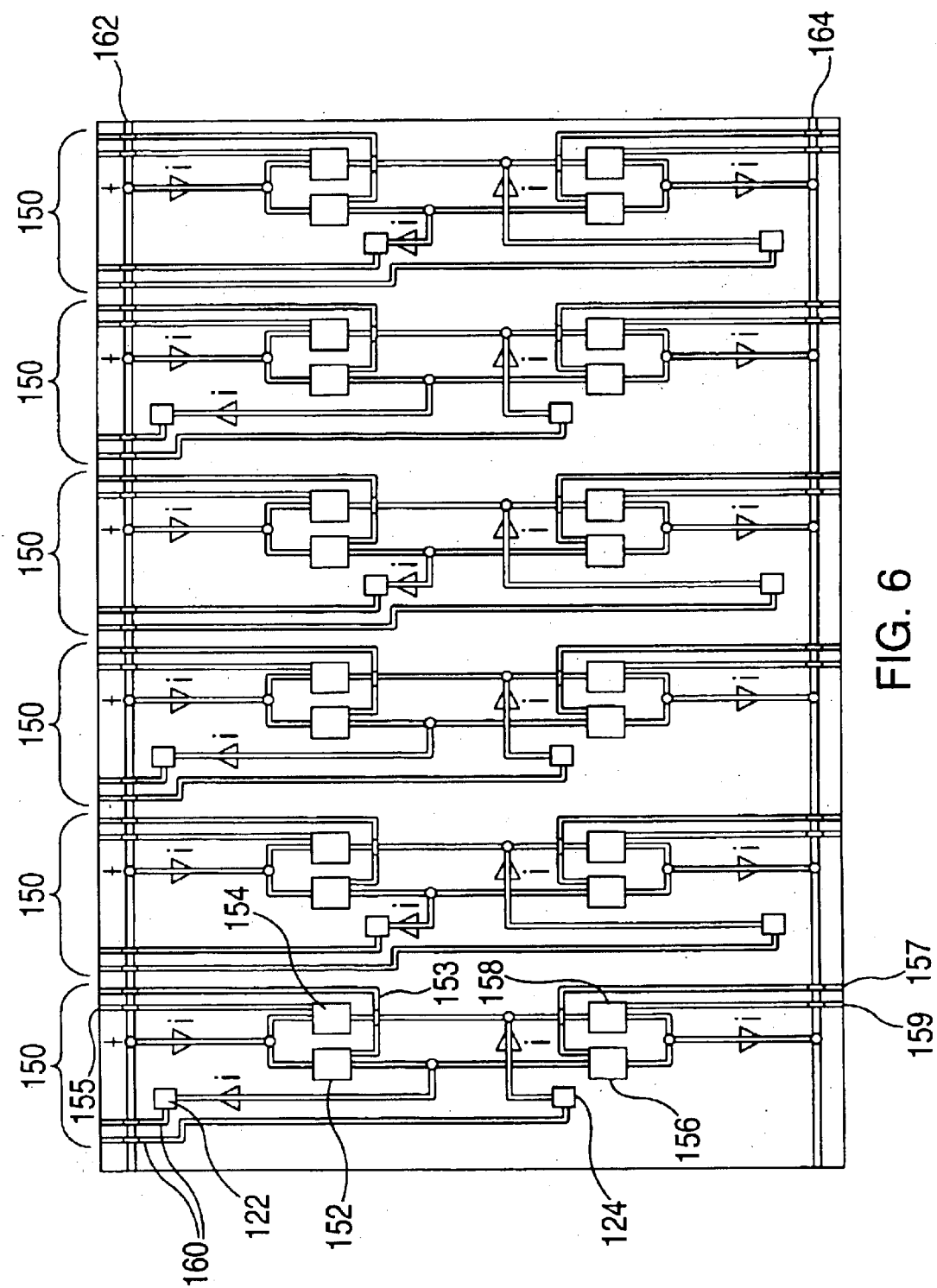
FIG. 6 is a schematic illustration of the layout of the control/driver electronics of FIG. 5.
Figure 7:
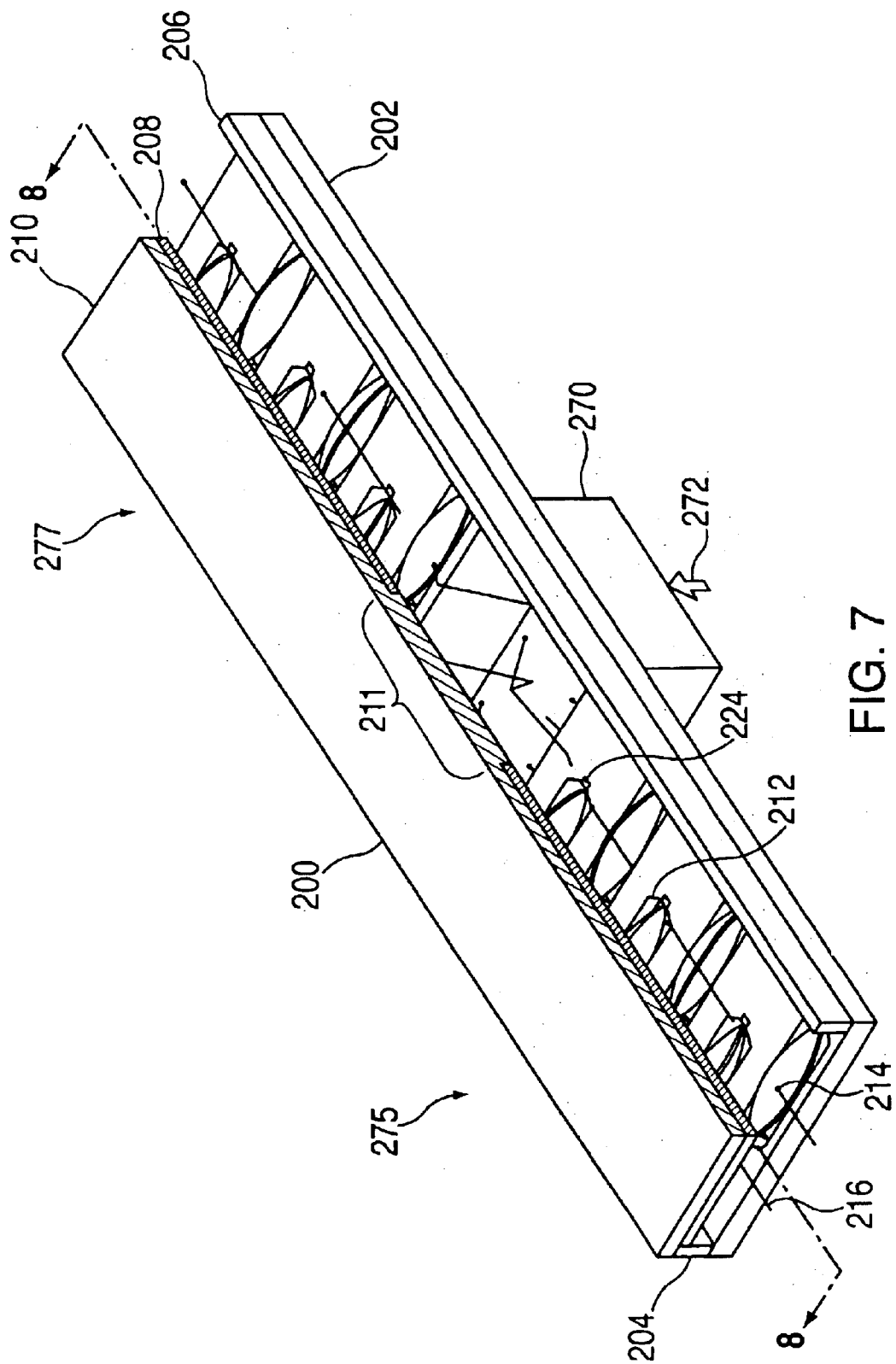
FIG. 7 is a perspective, partial sectional view of a portion of another nanotube electromechanical system constructed in accordance with the present invention.
Figure 8:
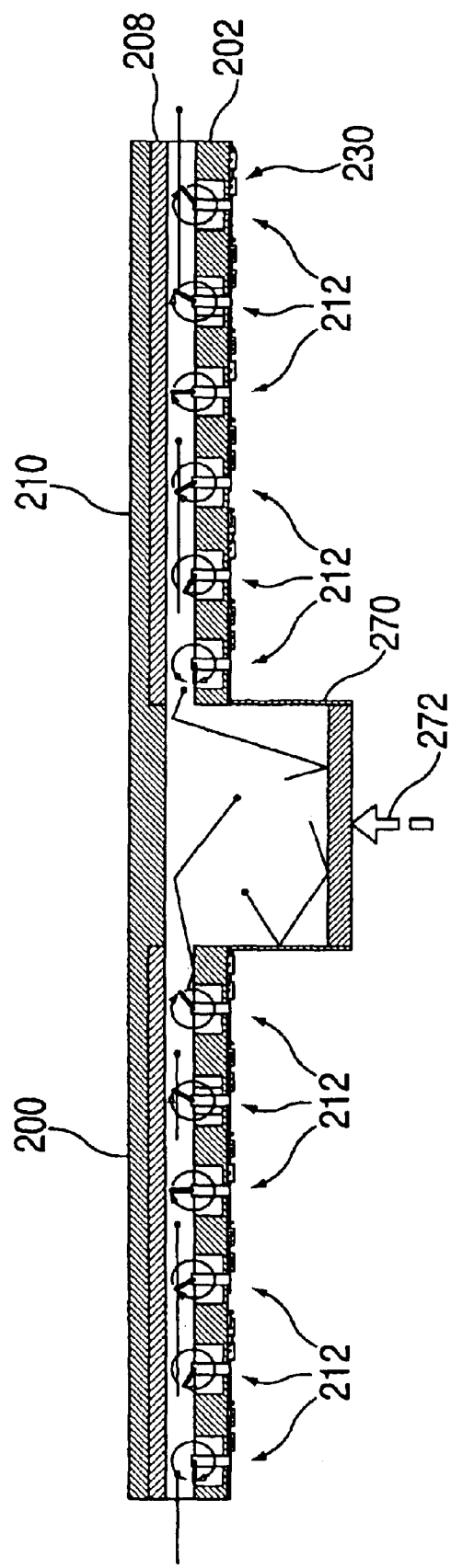
FIG. 8 is a cross-sectional plan view of the portion of the nanotube electromechanical system of FIG. 7, taken along line 8—8.

FIGS. 5 and 6 provide an illustration of one example of control/driver electronics 130. FIG. 5 show how electronics 130 may be essentially affixed to the bottom of substrate 102. Locating the driving or switching transistors close to their associated nanotube may be preferable for many applications in order to minimize the power required by maintaining low interconnection resistances. The formation of electronics 130 on substrate 102 may be accomplished by any of a variety of conventional manners. As illustrated in this example, each of nanotubes 120 is provided with a driver circuit 150 formed from four transistors 152–158, sensor leads 160, control lines 153, 155, 157 and 159, and transistors 152, 154, 156 and 158, respectively. For clarity, only one instance of the individual elements of driver circuit 150 are labeled, but each instance of driver circuit 150 is substantially similar to that shown and described herein. Each instance of driver circuit 150 is associated with one of the nanotube assemblies 112. The control lines lead to additional electronics, not shown, which are coupled to the transistors for controlling the transistors.

Electronics 130 also includes a DC bus formed by lines 162 (hot) and 164 (ground), with each of these DC bus lines attached to half of the transistors. The pads 112, to which the nanotubes 120 are anchored and connected, extend through the substrate to provide a direct connection to electronics 130. Each pad is connected to two transistors such that each end can be switched to either of two bus lines in a standard H-bridge driver configuration. Sensor leads 160 measure the voltage across nanotubes 120, which can provide position and velocity information, and this information may be used to determine which polarity and timing of current pulses should be transferred to the nanotube in order to accelerate it in the proper direction.

While driver circuit 150 is shown to include four transistors 152, 154, 156 and 158, persons skilled in the art will appreciate that nanotubes 120 may be current pulsed by circuits having only one or two transistors each, if rotation is to be unidirectional. The use of four transistors enables each nanotube 120 to be rotated in either direction. If nanotubes 120 are rotated in a counter clock-wise direction (opposite of that shown), they will push the molecules of the working substance through the channel started from end 128, rather than exiting there. When used in a power generation embodiment of this invention, the transistors would be timed to transfer the current generated in the nanotubes into an external load. Further, it may be preferable to include other components, either passive or active, to further limit, amplify or otherwise modulate the current flowing through the nanotubes. Persons skilled in the art will also recognize that these electronics may be made as an integrated circuit or integrated transistor array, rather than as discrete components as shown. Electronics 130 may be formed on the substrate 102, through means such as photolithographic and etching techniques, or the electronics may be attached later through other means. Persons skilled in the art will also recognize that transistors 152, 154, 156 and 158 may be any of many devices which switch or modulate current, such as, but not limited to bipolar transistors, J-FETS, MOSFETS, switches or transistors made using other nanotubes. As will be shown in a later drawing, an electrostatically coupled embodiment of an assembly similar to assembly 100 with similar function can be made by including pads or plates in the walls or floor of the troughs, with said plates or pads connected to similar control/driver electronics.

FIGS. 7–10 show another embodiment of the present invention as nanotube assembly 200, which is constructed in accordance with the principles of the present invention and is a method of application for this invention. In many aspects, assembly 200 is substantially similar to that described with respect to assembly 100. Accordingly, the descriptions above apply here equally as well. For convenience, each of the components of assembly 200 that are substantially similar to components of assembly 100 are similarly numbered, except that the first digit is "2" instead of "1". For example, while each of the individual nanotube assemblies of this invention in FIGS. 7–10 is labeled 212 versus 112 in FIGS. 1–6, they are substantially the same.

In fact, it may be noted that, in some aspects, assembly 200 is simply two instances of assembly 100 formed together on either side of a "hot box" chamber 270, with the chambers of these assemblies containing one or more nanotube assemblies. For example, assembly 100 includes six instances of electromagnetically coupled nanotube assemblies 112 of the present invention, while assembly 200 includes two sets of similar arrays of six electromagnetically coupled nanotube assemblies 212, with each set of assemblies on ether side of chamber 270 and each nanotube assembly 212 containing a nanotube suspended over a trough between two pads 224. Thus, assembly 200 may be formed with two assemblies 100 and a central chamber by replacing two upper substrates 110 with a single upper substrate 210, that includes an additional portion 211 that is configured to be parallel to the surface of permanent magnets 208, such that the upper interior surface of the channel remains substantially flat.

Assembly 200 operates differently than assembly 100 because chamber 270 is heated from an external source, as indicated by arrow 272. The heat input to chamber 270 may be supplied by various means, including, but not limited to, external combustion of a fuel, a radioisotope thermal source, a waste heat source or solar heating. Accordingly, if assembly 200 is mounted to a microprocessor, the source of heat may simply be the heat generated by the microprocessor, while also providing a heat sink for the microprocessor. Alternatively, those skilled in the art will recognize that the chamber 270 may be any size without departing from this invention, and may contain other features to improve the heat transfer between the heat source 270 and the working fluid which passes through said chamber, where said features may include, but are not limited to, finned protrusions, modified emissivity of surfaces, single-phase heat pipes or two-phase heat pipes.

The inclusion of heated chamber 270 between two nanotube assembly channels results in a device that is essentially a nanometer to micrometer scale turbine generator or jet engine. In this instance, the working substance is likely to be a gas, which is compressed by the rotating nanotubes located in subassembly 275, thereby forcing said gas to enter the heated chamber 270 at an increased pressure. The gas is heated in the chamber and allowed to expand through subassembly 277, driving the nanotubes as this gas exits. The gas will pass through a Brayton cycle approximately, during its transition through this device. The nanotube assemblies 212 contained in subassembly 275 function as a motorized compressor, being driven by input current from the control/driver electronics 250. The nanotubes assemblies 212 contained in subassembly 277, on the other hand, operate as turbine generators, being driven by the hot gas flow exiting chamber 270 and generating electrical currents, with generated power switched into a load by the control/driver electronics or used to drive the compressor. This functionality is essentially the same functionality obtained in macroscale open-cycle Brayton generators and jet engines through the use of turbine wheels. As with those macroscale devices, the system shown in FIGS. 7–10 can provide a net electrical power or a propulsive-thrust based on the heat input.

Figure 9:
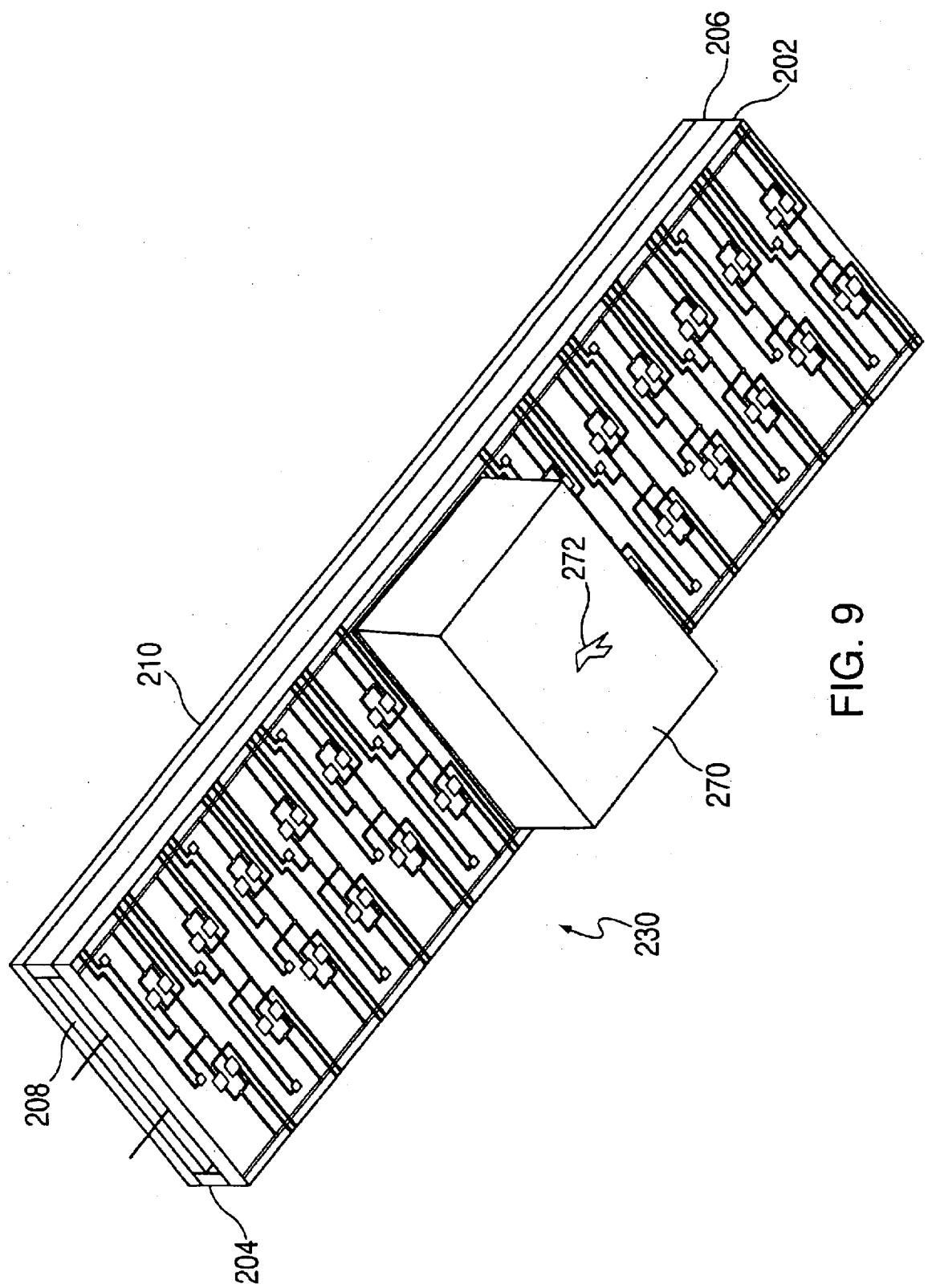
FIG. 9 is a three-dimensional, perspective view of the underside of the nanotube electromechanical system of FIG. 7, which shows the control/driver electronics.
Figure 10:
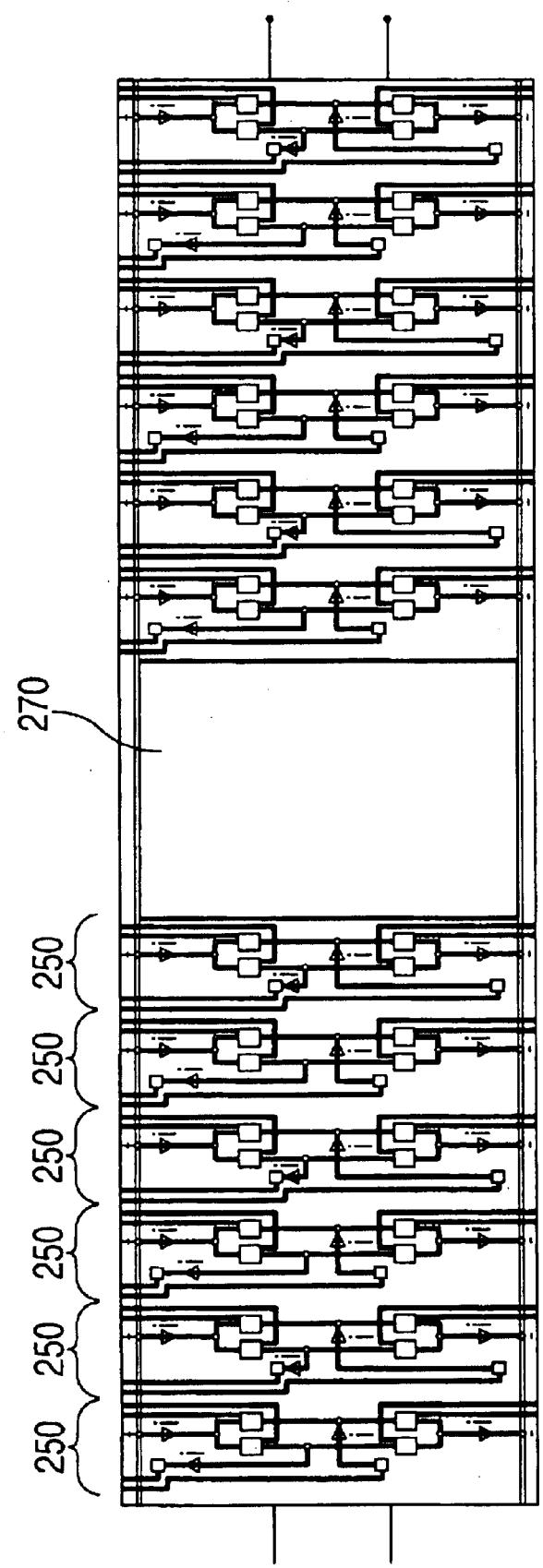
FIG. 10 is a schematic illustration of the layout of the control/driver electronics of FIG. 9.

FIGS. 9 and 10 show the control/driver electronics mounted on the opposite side of substrate 202 from the nanotubes and the channel. Each identical nanotube subassembly 212 has an identical associated section of control/driver electronics 250. Again, the mounting pads 224 extend through the substrate 202 and provide a connection to control driver/electronics. The magnetic fields are provided by permanent magnets 208, but may be provided by other means as previously described.

Alternatively, as with other heat engines, the assembly shown in FIGS. 7–10 can also be operated as a heat pump or refrigerator to cool an object in contact with chamber 270, by providing a net positive electrical input to the system. Also, the assembly 200 may be constructed using electrostatically coupled nanotubes in each nanotube assembly 212 instead of the electromagnetically coupled nanotubes shown, as previously described for assembly 100.

Figure 11:
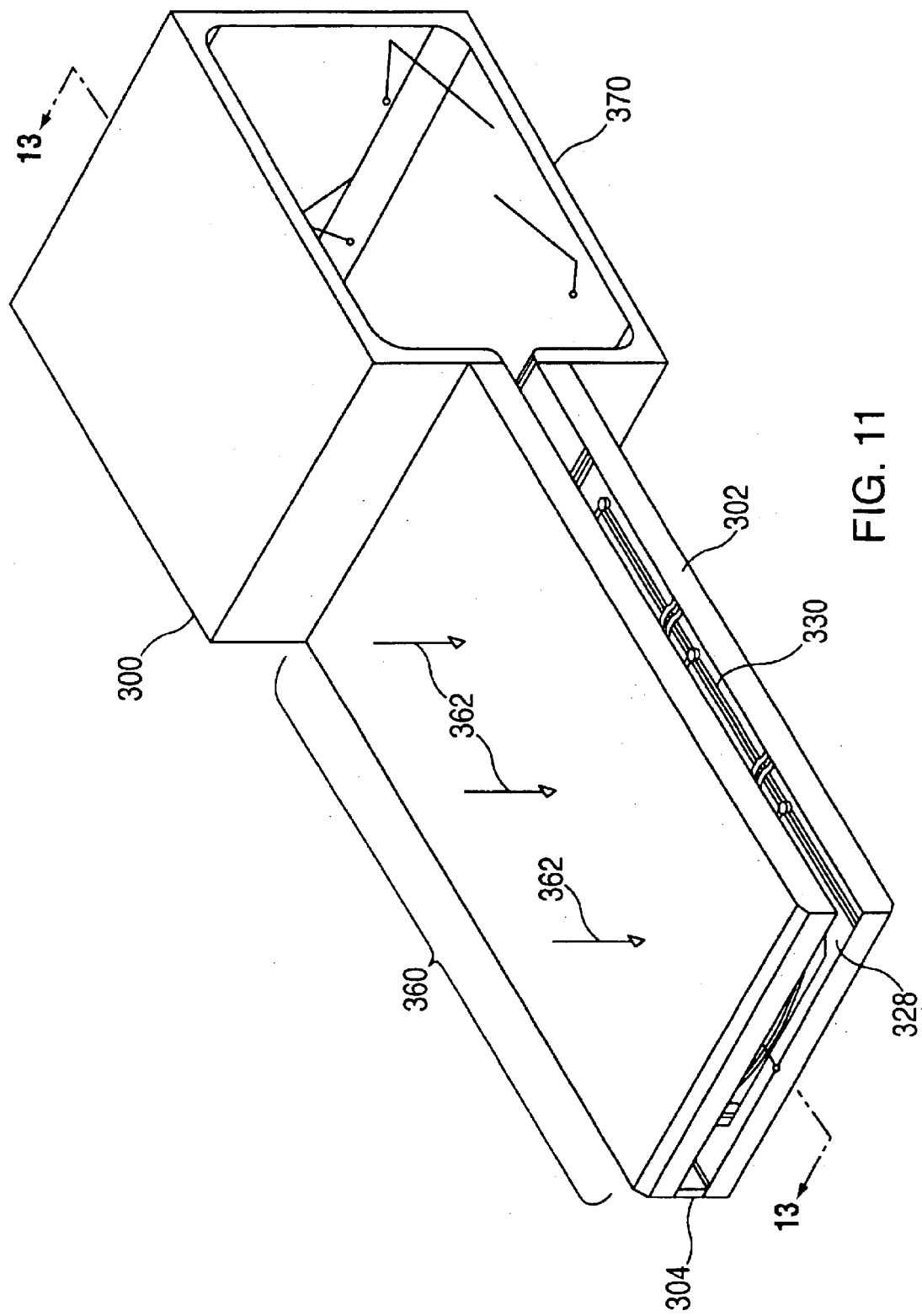
FIG. 11 is a perspective, partial-sectional view of a portion of another nanotube electromechanical system constructed in accordance with the present invention.
Figure 12:
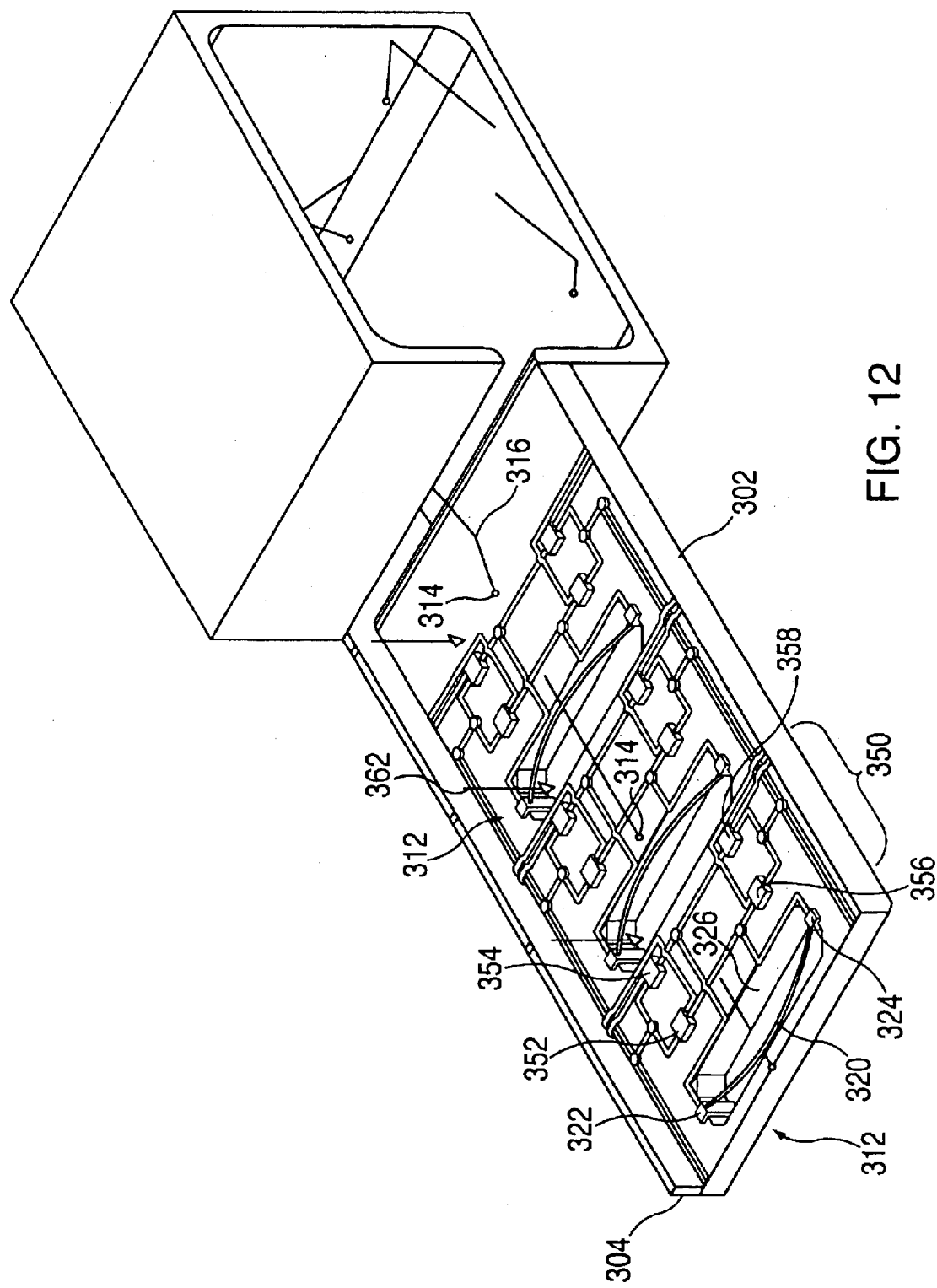
FIG. 12 is a perspective view of the portion of the nanotube electromechanical system of FIG. 11 in which a portion of the upper surfaces have been removed to expose the individual nanotube assemblies and circuitry.
Figure 13:
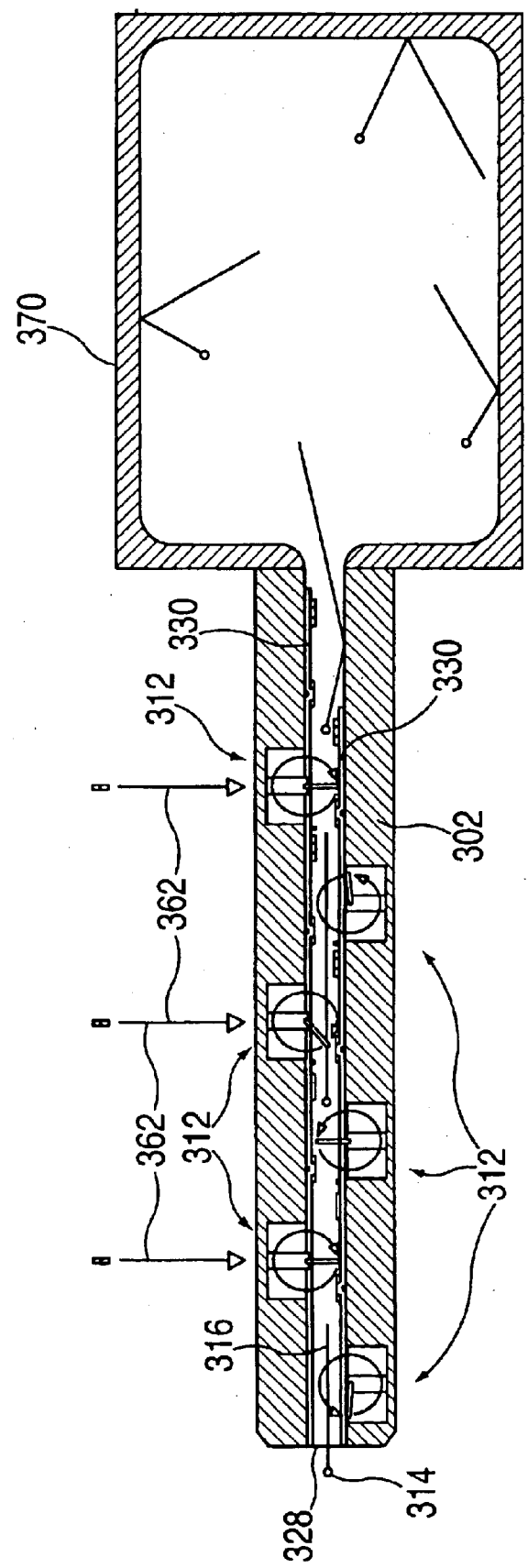
FIG. 13 is a cross-sectional plan view of the portion of the nanotube electromechanical system of FIGS. 11 and 12 taken along line 13—13.

FIGS. 11–13 show another alternate embodiment of a nanotube electromechanical assembly 300 constructed in accordance with the principles of the present invention. Assembly 300 is also based on the principles described above with respect to assemblies 200 and 300, in that it contains one or more of the electromagnetically driven nanotube jump-rope assemblies of the present invention for the purpose of driving a working fluid in a preferred direction. Assembly 300 includes a vacuum pump assembly 360 and a chamber 370. Vacuum pump 360 includes a lower assembly that is similar to the base of assembly 100, in that it includes a lower substrate 302, nanotube assemblies 312, electronics 330 and side chamber walls 304. Assembly 300 also includes a channel wall opposite 304, but it has been removed for illustrative purposes only.

Unlike assemblies 100 and 200, assembly 300 includes an upper assembly which also contains nanotube assemblies 312 and is essentially similar to the lower assembly, differing only to the extent that the location of the nanotube assemblies varies depending on the distance down the channel. Another difference between assembly 300 and those previously discussed is that the driver circuits 350 are located within the pump channel, rather than on the opposite side of the substrate. This location of circuits is arbitrary for proper function of the nanotube assemblies, but when the fluid is compatible with the electronics, such as in a vacuum system, the control/driver electronics 350 may be situated inside the channel so that connection pads 322 and 324 do not need to extend through the substrate. Also, the permanent magnets are not shown in FIGS. 11–13 and the external magnetic field is simply indicated by arrows 362, which may again be provided by a permanent magnet or by other means as previously discussed.

Operation of assembly 300 is similar to previous assemblies in that a multiplicity of nanotube assemblies 312 function together forcing molecules of a working fluid 314 down the central channel. In this case, a working fluid, which is contained in chamber 370 is pumped through vacuum pump assembly 360 by the upper and lower assemblies of nanotubes. As illustrated in FIG. 13, nanotubes 320 in the upper assembly rotate in a clockwise direction, while nanotubes 320 in the lower assembly rotate in a counter-clockwise direction. Thus, the nanotube assemblies in the upper and lower assemblies cooperate, due to the offset location of these nanotubes, to accelerate the molecules of the working fluid 314 out of the exit 328. The line 316 indicates a potential path of one of these molecules.

Accordingly, if the chamber 370 is comprised of a sealed chamber containing gas under ambient conditions, the assembly 300 of FIGS. 11–13 will perform as a vacuum pump to remove the gas from the chamber and maintain a vacuum condition in the chamber. Alternatively, if the fluid in chamber 370 is comprised of a substantial quantity of liquid or gas, then the assembly 300 of FIGS. 11–13 will perform as a reaction rocket engine by propelling the fluid at high velocity. Alternatively, multiple assemblies consistent with assembly 300 may be combined to provide an injection system for fuels and oxidants in combustion systems, for fuels and oxidants in chemical rocket engines, or for controlled fluid or gas injection in a variety of chemical and medical applications. Persons skilled in the art will appreciate that if the direction of nanotubes 312 is reversed, assembly 300 will compress gas into chamber 370.

Figure 14:
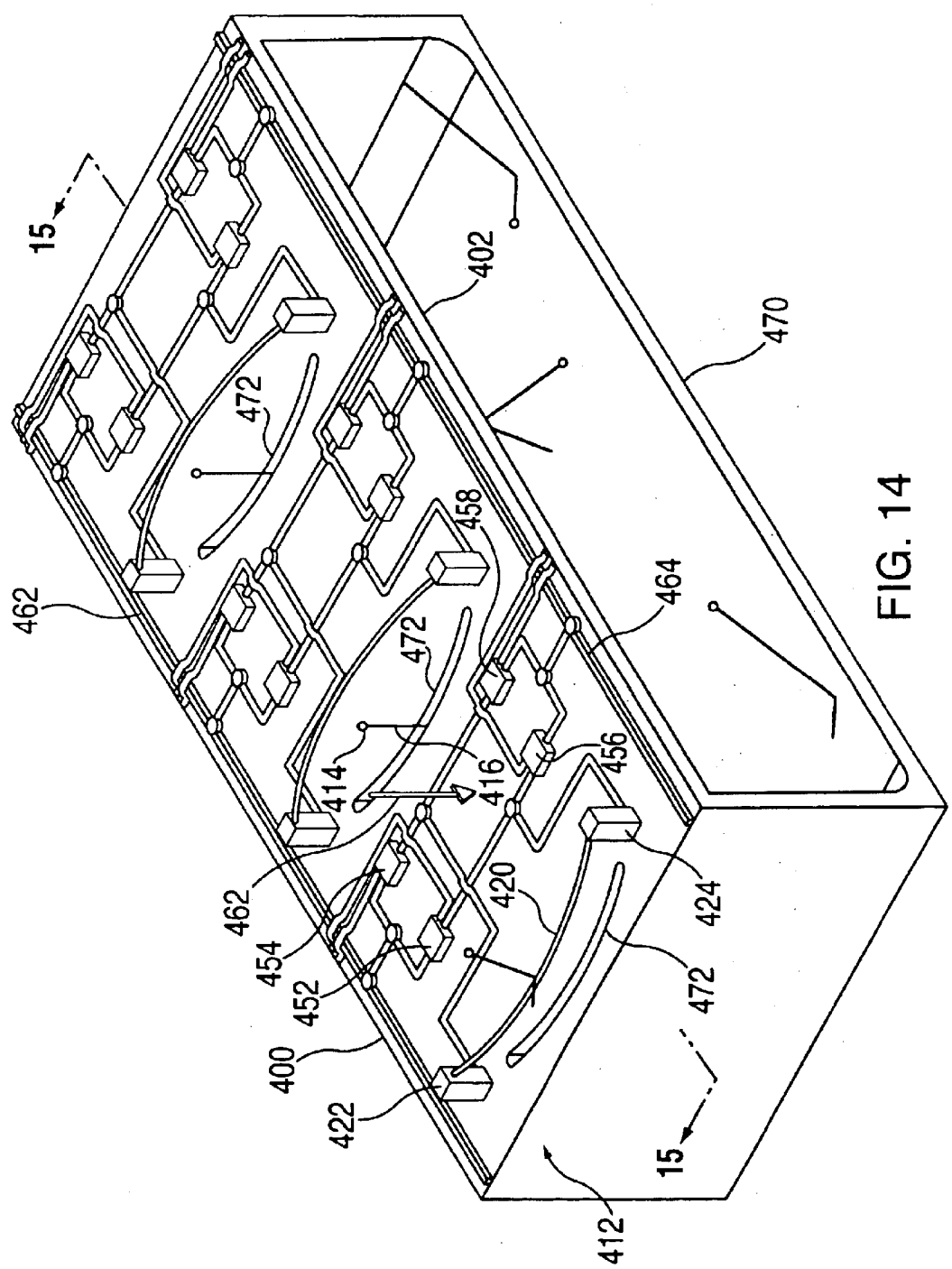
FIG. 14 is a perspective view of a portion of another nanotube electromechanical system constructed in accordance with the present invention.
Figure 15:
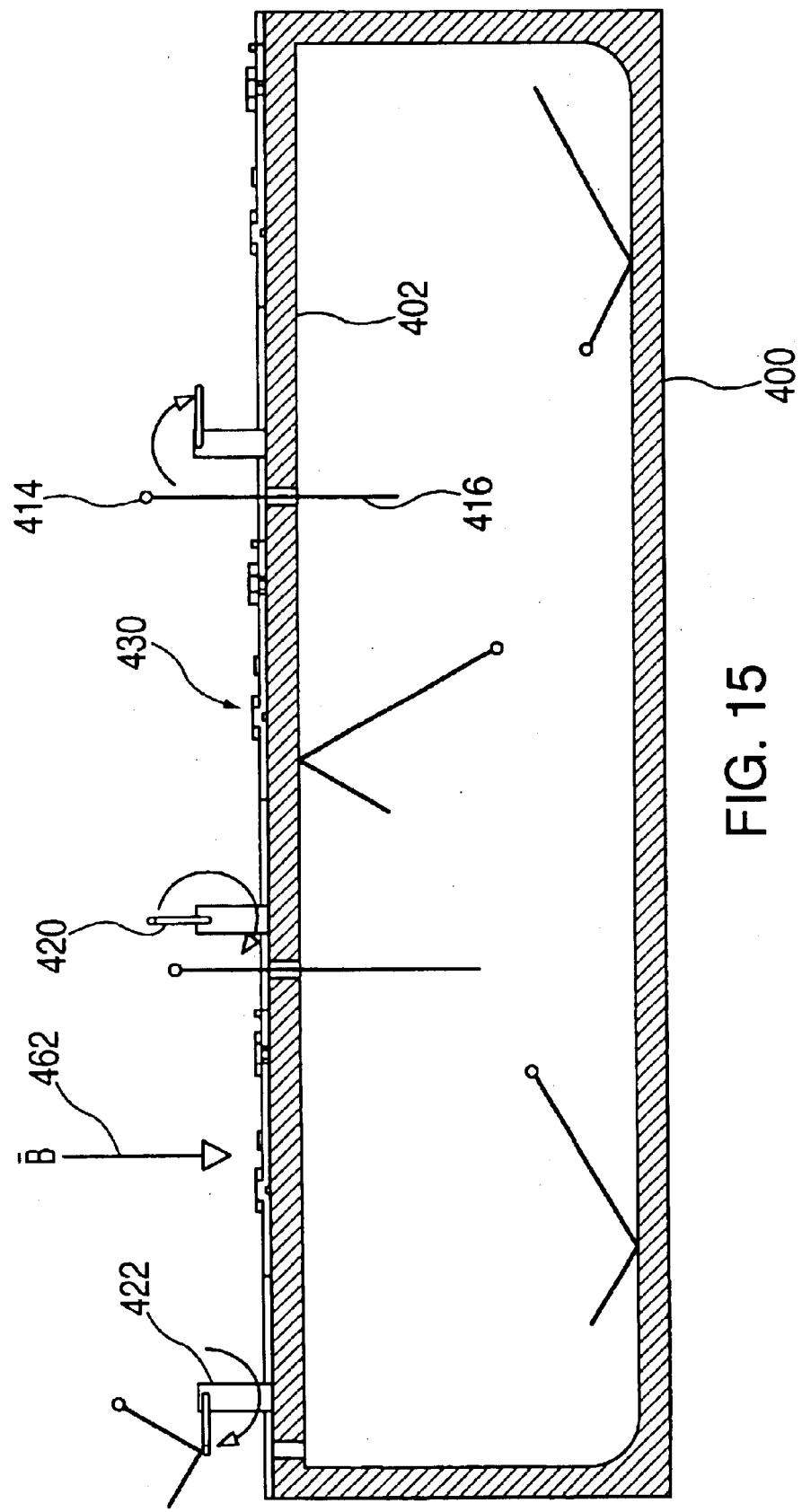
FIG. 15 is a cross-sectional plan view of the portion of the nanotube electromechanical system of FIG. 14 taken along line 15—15.

FIGS. 14 and 15 show an additional alternate embodiment of a nanotube electromechanical assembly 400 constructed in accordance with the principles of the present invention. Assembly 400 is also based on the principles described above in that it contains one or more of the electromagnetically driven nanotube jump-rope assemblies of the present invention for the purpose of driving a working fluid in a preferred direction. Accordingly, the same numbering scheme applies, such that nanotubes 420 are substantially similar to nanotubes 120, and hence the previous discussion also applies to nanotube 420.

The differences between assembly 400 and the previously described assemblies are as follows. Each of assemblies 100, 200 and 300 are configured to pump molecules in series, from one nanotube to another. The nanotubes of assembly 400, however, are configured to pump working substance in parallel, essentially independently of each other. In addition, the upper portion of chamber 470 also serves as the substrate 402 to which control/driver electronics 430 and nanotube assemblies 412 are mounted. Channels 472 are provided through the substrate 402 to allow transfer of the working fluid from the interior of chamber 470, as indicated by the trajectory 416 of the molecule 414. In this embodiment, the nanotubes are suspended from posts 422 and 424 to which they are mechanically and electrically connected, with these posts being of sufficient height to prevent the nanotubes from striking the substrate during rotation. These posts may also be flexible to allow increased slack in the nanotube at higher rotational speeds.

Similar to assembly 300, assembly 400 also shows the external magnetic field indicated by arrows 462, which may still be provided by permanent magnets or other means. Again, the control electronics are shown with four transistors 452, 454, 456, and 458 corresponding to each individual nanotube assembly, allowing independent bidirectional control of each nanotube. If the nanotubes are desired to be synchronized, however, a parallel array of such assemblies could be driven by a single instance of the control/driver electronics by electrically connecting all posts 422 to one side of the driver circuit and connecting all posts 424 to the other side of the driver circuit. Alternatively, if a unidirectional rotation of the nanotubes is desired then the driver circuit may contain only one or two transistors instead of the four shown. Persons skilled in the art will appreciate that the lower chamber of assembly 400 may be removed such that assembly 400 may be utilized as a propulsion system.

Pumping the fluid simultaneously through parallel channels with multiple nanotubes, as in assembly 400, can increase the flow rate obtained by the assembly, whereas pumping the fluid sequentially through a singles channel, as in assemblies 100, 200 and 300, can increase the pressure difference obtained by the assembly. Accordingly, it is apparent that combinations of parallel pumping and sequential pumping arrays of nanotubes can be used to obtain a variety of flow rates and pressure differences. Similarly, the variety of flow rates and pressure differentials seen in generation applications, such as wind power generation or heat engines, can be utilized by combinations of parallel nanotube and series nanotube arrays.

Figure 16:
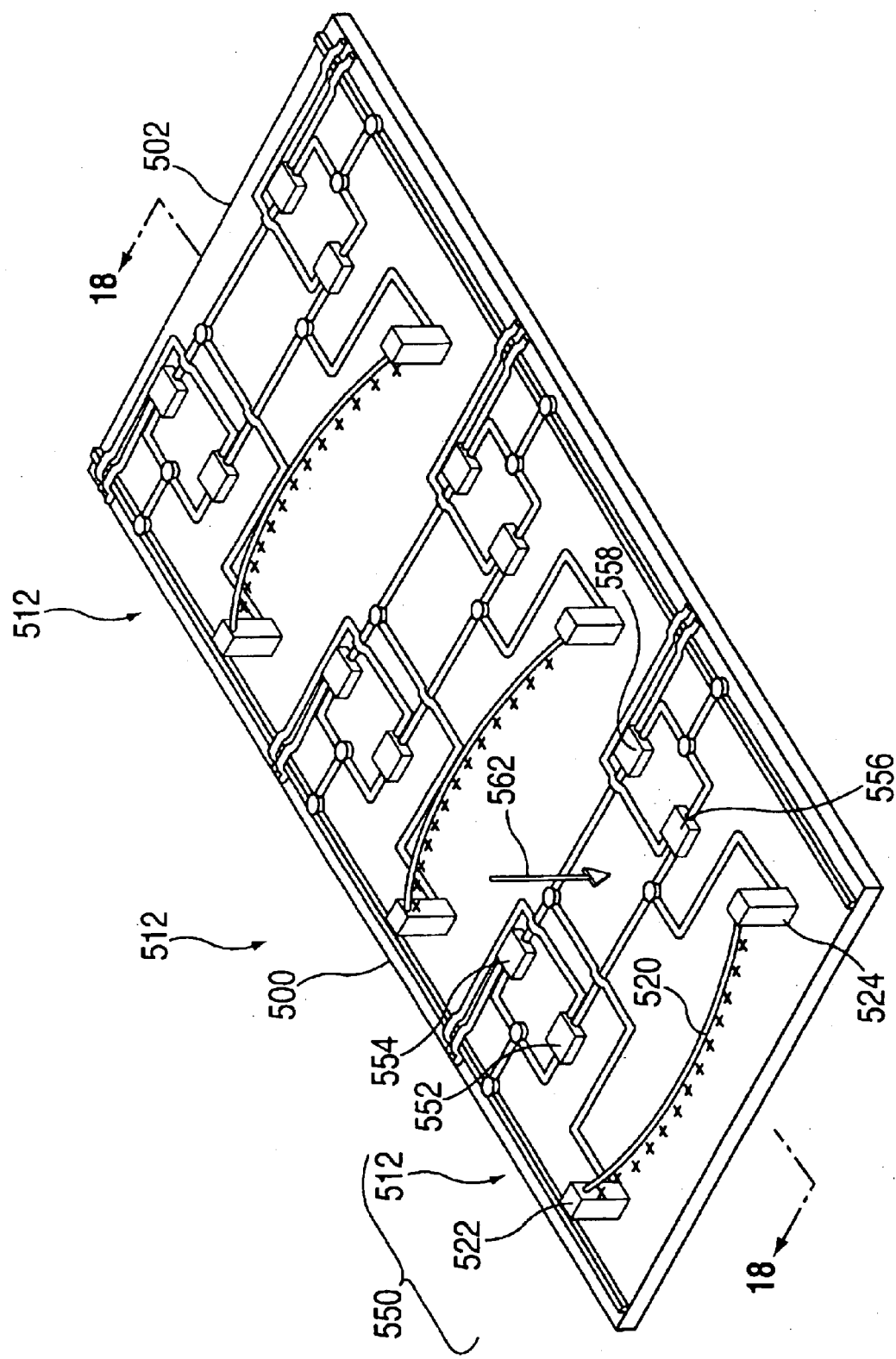
FIG. 16 is a perspective view of a portion of another nanotube electromechanical system constructed in accordance with the present invention.
Figure 17:
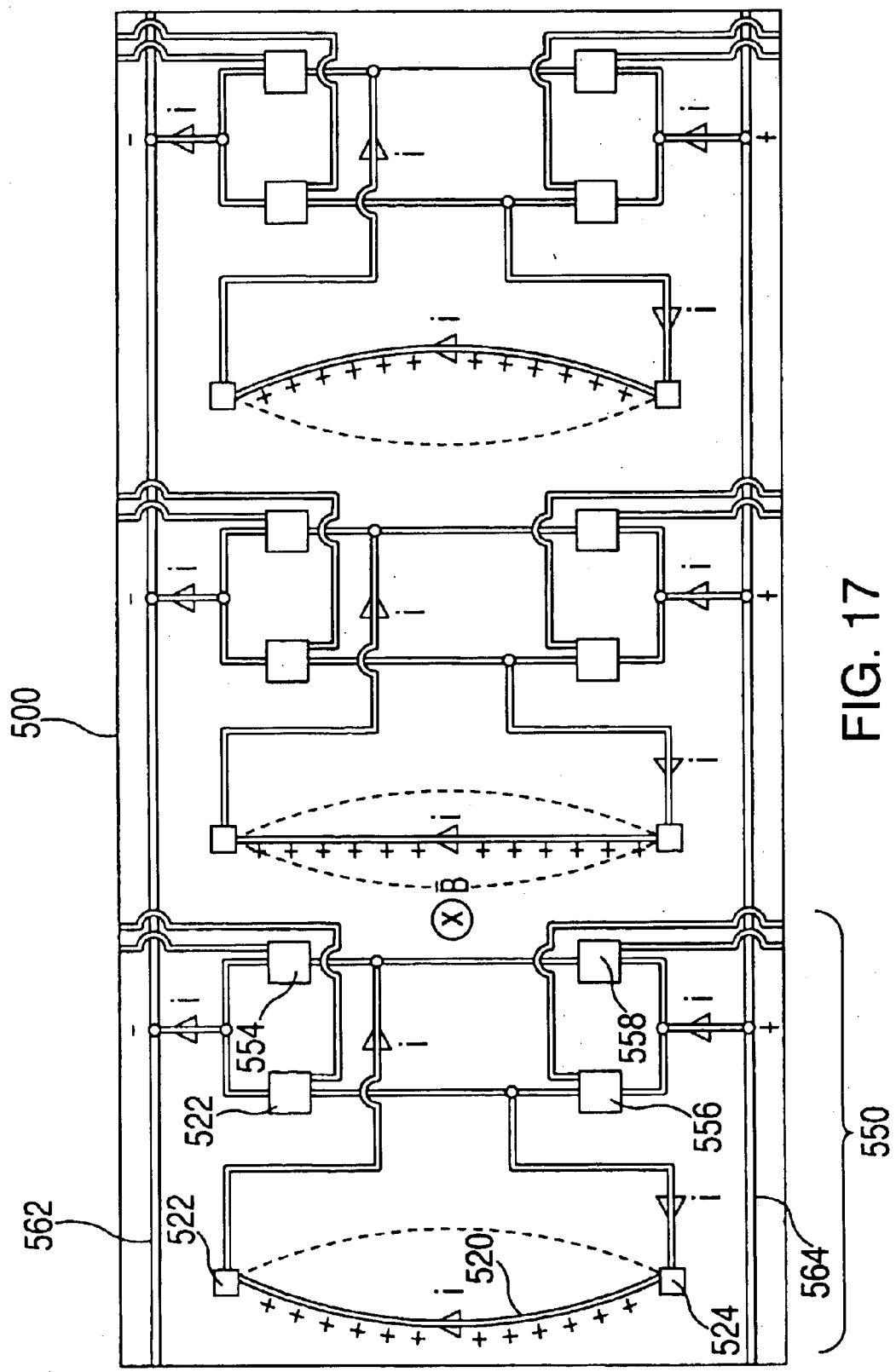
FIG. 17 is a schematic illustration of the layout of the control/driver electronics of FIG. 16.
Figure 18:
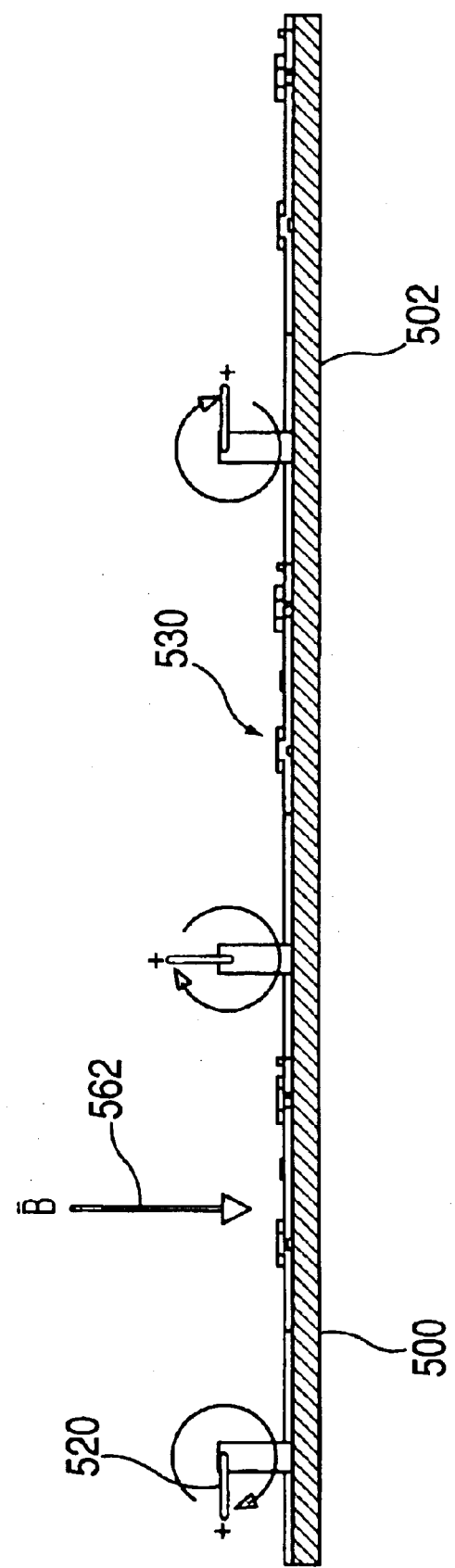
FIG. 18 is a cross-sectional plan view of the portion of the nanotube electromechanical system of FIG. 16 taken along line 18—18.

FIGS. 16, 17 and 18 show an additional alternate embodiment of a nanotube electromechanical assembly, assembly 500, in which the individual electromagnetically coupled nanotubes 520 are used to transmit and receive electromagnetic signals, in accordance with the principles of the present invention. Nanotube assemblies such as assembly 500 could also be applied as magnetic field sensors or magnetic field generators. Furthermore, assemblies such as assembly 500 could be applied as a READ/WRITE head for a magnetic storage medium. Assembly 500 includes a lower substrate 502, to which three suspended nanotube assemblies are fabricated. Each nanotube assembly 512 includes a nanotube 520 mounted between posts 522 and 524 and driver electronics circuit 550, which includes four transistors 552, 554, 556 and 558 and interconnection circuitry. An external magnetic field is applied to assembly 500 as indicated by arrow 562.

As shown in FIGS. 16–18, an electric charge can be applied to nanotubes, as indicated by the "+" signs on each of nanotubes 520, by the application of a bias voltage to either of pads 522 or 524 or to assembly 500 itself. Assembly 500 may be operated as an electromagnetic transmitter by rapidly rotating nanotubes 520, which thereby accelerates the charge stored therein. The accelerated charge creates electromagnetic radiation at a frequency that is substantially equal to the rotational frequency of the nanotubes. The accelerated charge creates electromagnetic radiation at a frequency that is substantially equal to the rotational frequency of the nanotubes. Unlike a conventional antenna in which charge must be moved through one or more resistive elements, the accelerated charge in the nanotubes suffers significantly less resistive losses and operation is significantly more efficient than conventional devices.

Nanotube assembly 500 may be operated as an electromagnetic receiver by similarly storing charge on nanotubes 520. The charged nanotubes would then vibrate in response to external electromagnetic signals, and the vibrational motion could then be converted into an AC voltage as the rotating tube moves through the assembly's external DC magnetic field 562. While control/driver electronics 550 is shown as including the four transistor circuits previously described, there is less likelihood of a need for bi-directional rotation in assembly 500 than in the previously described assemblies. Accordingly, it may be more efficient and cost effective for driver circuits 550 to be formed from one or two transistors. It may be preferable to suspend the nanotubes 520 across a trench, as in assemblies 100, 200 or 300, rather than on posts as shown in FIG. 500 without loss of functionality in this application. Also, as with other assemblies shown, it may be preferable to have one or more conductive plates or pads embedded in the surface of substrate 502 and connected to control/driver electronics 550 such that nanotube 520 may be driven via electrostatic forces, in which case, the applied magnetic field 562 is not necessary. Furthermore, nanotube assembly 500 may be constructed with uncharged nanotubes such that nanotube assembly 500 does not create unwanted electromagnetic waves which otherwise may be provide by fast-spinning charged nanotubes.

Figure 19:
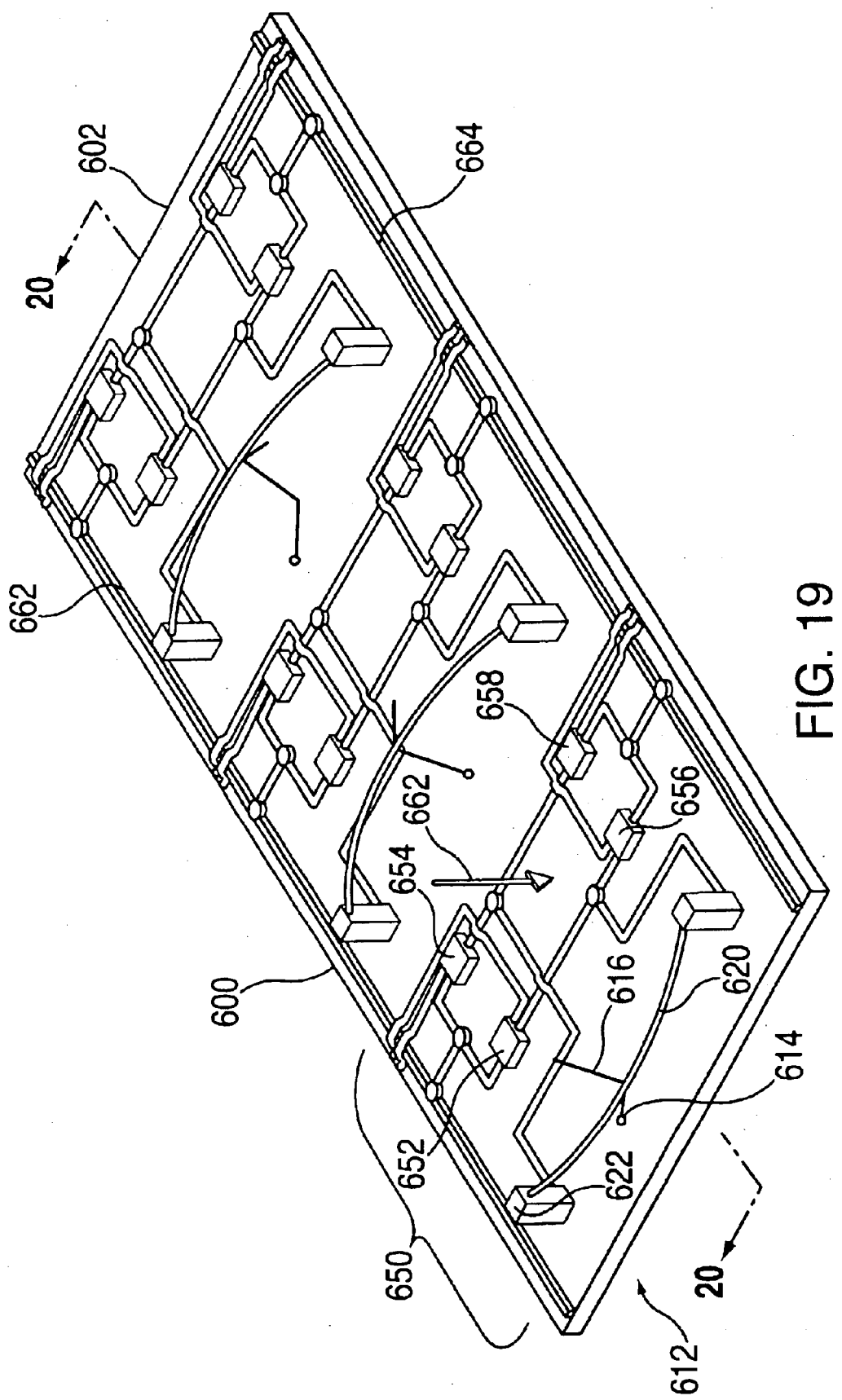
FIG. 19 is a perspective view of a portion of another nanotube electromechanical system constructed in accordance with the present invention.
Figure 20:
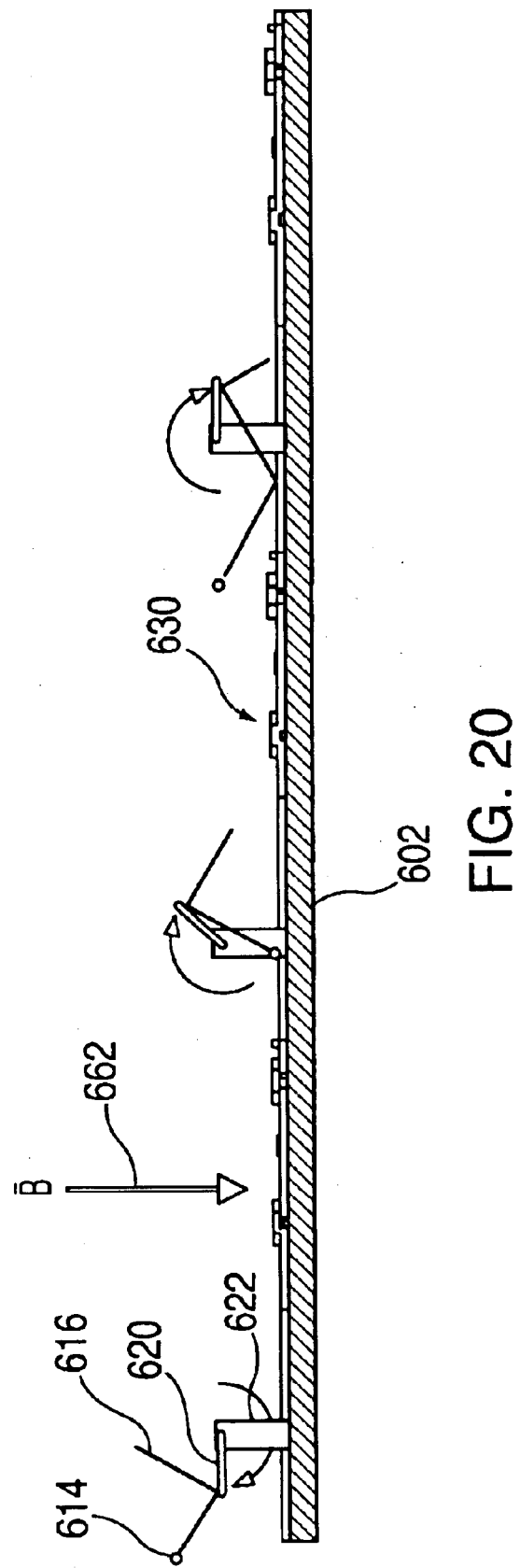
FIG. 20 is a cross-sectional plan view of the portion of the nanotube electromechanical system of FIG. 19 taken along line 20—20.

FIGS. 19 and 20 show an additional alternate embodiment of a nanotube electromechanical assembly 600 constructed in accordance with the principles of the present invention. Assembly 600 is also based on multiple instances of an electromagnetically coupled suspended nanotube with the principles discussed above and accordingly, the same numbering scheme applies here as well; e.g., nanotubes 620 are substantially similar to nanotubes 120, and therefore, the earlier discussion above also applies to nanotubes 620.

In particular, assembly 600 is substantially similar in configuration to nanotube assembly 500 described above in that it is based on a single substrate 602, and includes nanotubes 620 suspended between posts which are electrically connected to control driver electronics fabricated on the surface of substrate 602. A magnetic field indicated by arrows 662 is applied by means external to the drawing. Although very similar to assembly 500 without the applied bias charge, assembly 600 illustrates that the same assembly can be applied to operate as a propulsion system. To indicate the use as a propulsion system, the illustrations of FIGS. 19 and 20 include the working system molecules 614 and path indicator 616 for these molecules.

In nanotube assembly 600, nanotubes 620 are rotated at high speed by application of pulsing currents provided that an external magnetic field is applied to assembly 600. FIGS. 19 and 20 illustrate the impact of rotating nanotubes 620 with molecules 614, and the resultant drastic change of path of molecules 614. The molecules of the working substance, preferably air in this instance, bounce off of the nanotubes at high speeds. The molecules that are driven into substrate 602 by interaction with the nanotubes will bounce off of the substrate at higher speeds than those that are struck away from the substrate; i.e., those molecules which are struck by the nanotubes will have a higher impact velocity with the substrate. This action results in a net positive force on substrate 602 opposite the direction of the departing molecules, so that it is effectively propelled by the impacts of the air molecules.

Figure 21:
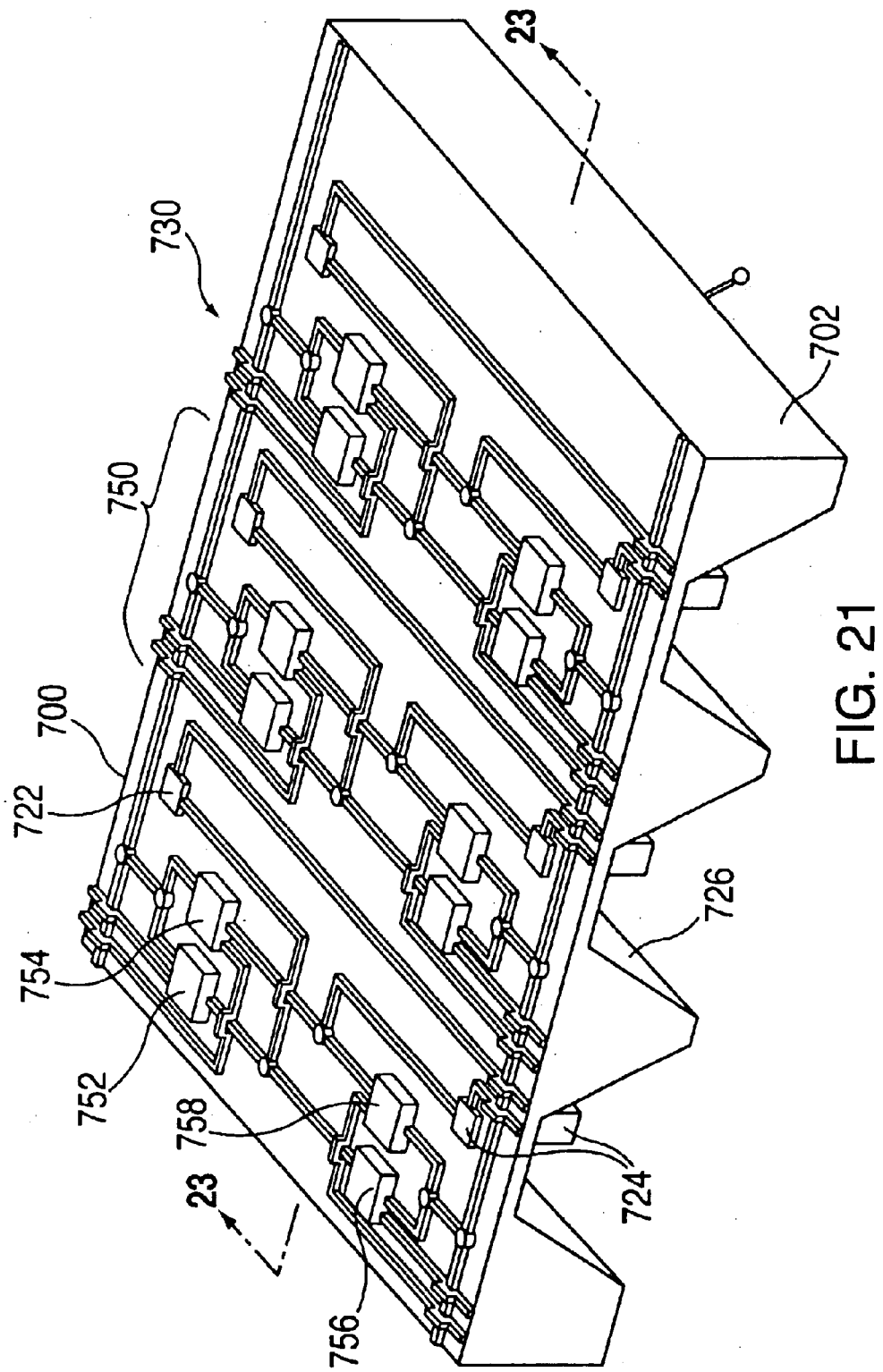
FIG. 21 is a perspective view of a portion of another nanotube electromechanical system constructed in accordance with the present invention, viewed from above the system.
Figure 22:
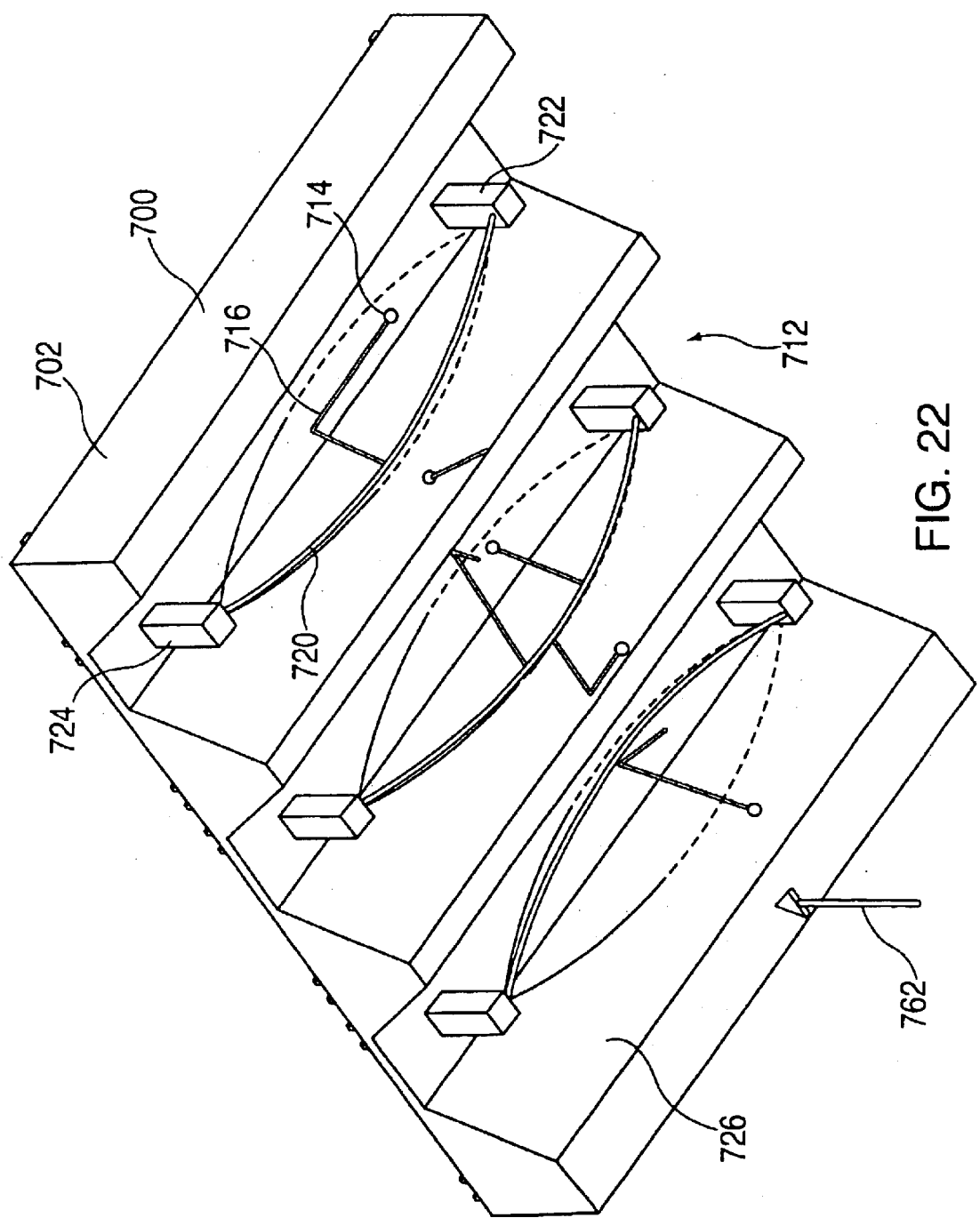
FIG. 22 is a perspective view of the portion of the nanotube electromechanical system of FIG. 21, viewed from below the system.
Figure 23:
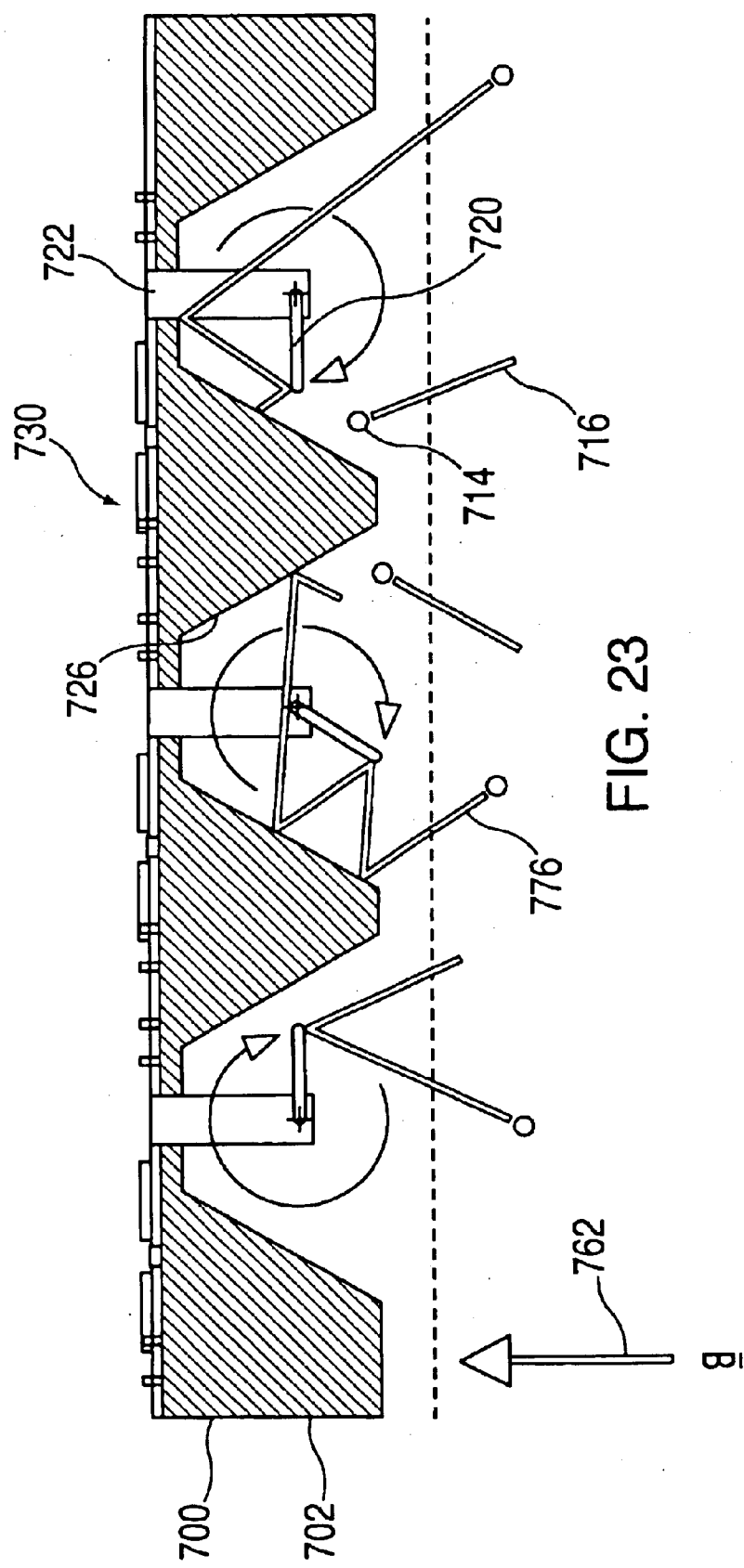
FIG. 23 is a cross-sectional plan view of the portion of the nanotube electromechanical system of FIG. 21 taken along line 23—23.

FIGS. 21 through 23 show an additional alternate embodiment of a nanotube electromechanical assembly 700 constructed in accordance with the principles of the present invention. Assembly 700 is also based on multiple instances of an electromagnetically coupled suspended nanotube with the principles discussed above and accordingly, the same numbering scheme applies here as well; e.g., nanotubes 720 are substantially similar to nanotubes 120, and therefore, the earlier discussion above also applies to nanotubes 720.

In particular, assembly 700 is substantially similar in configuration to nanotube assembly 600 described above, in that it is based on a single substrate 702 and includes nanotubes 720 suspended between posts 722 and 724. Also, assembly 700 is substantially similar in configuration to nanotube assembly 100 described above, the electrically conductive posts extend through the substrate 702 and are electrically connected to control driver electronics fabricated on the opposite surface of the substrate 702. In this assembly, the side of substrate 702 is configured such that each of the electromagnetically coupled nanotube assemblies is located entirely in a trough 726. This configuration of the sides of substrate may be a preferred configuration when assembly 700 is applied as a propulsion system, in which those molecules that are accelerated horizontally are able to contribute to the vertical thrust on the substrate.

As molecules 714 travel toward substrate 702, some of them are struck by nanotubes 720 while these suspended nanotubes are being driven at high rotational speed. Although some of the molecules will travel in paths similar to assembly 600, other molecules will have multiple impacts with the various side walls of substrate 702, such as the path 776. The configuration of troughs 726 and the resultant impact path 776 is that the energy from the horizontally accelerated substrate 702 to be propelled generally upward. Molecules that have single collisions with these side walls will impart both vertical and horizontal forces to the substrate, so, when the walls are symmetrically configured as in assembly 700, the horizontal components of force will average to near zero over a large number of collisions such that a net remaining force in a direction parallel to that of external magnetic field 762. Accordingly, side walls could be sloped in many configurations depending on the mean propulsive force desired. Furthermore, instead of the flat sides shown in FIGS. 21–23, the walls of the trench could be shaped in many ways to otherwise direct or amplify the mean resultant force, such as making a trench with a parabolic cross-section containing the nanotube in the focus.

Figure 24:
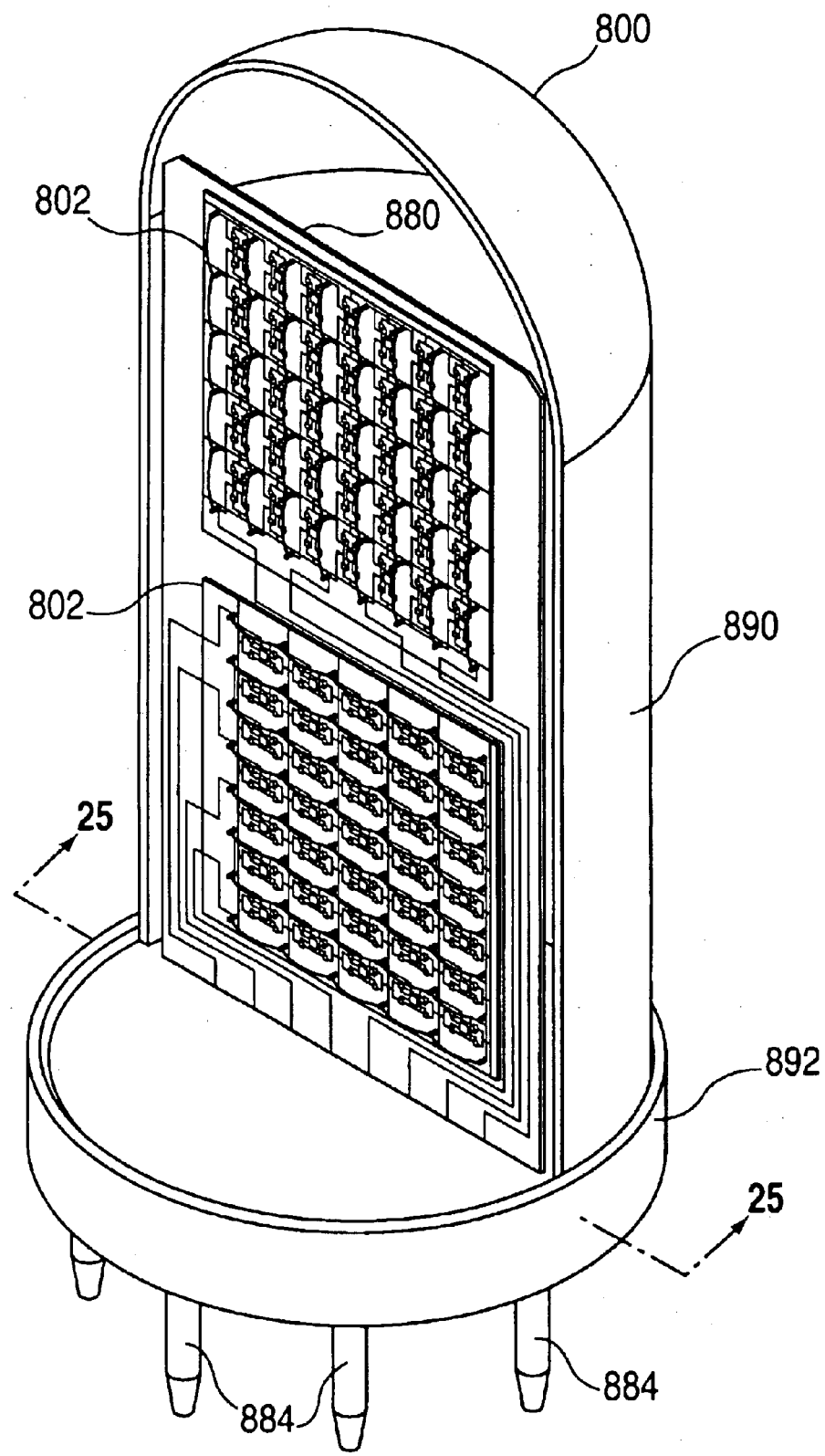
FIG. 24 is a perspective view of a portion of another nanotube electromechanical system constructed in accordance with the present invention.
Figure 25:
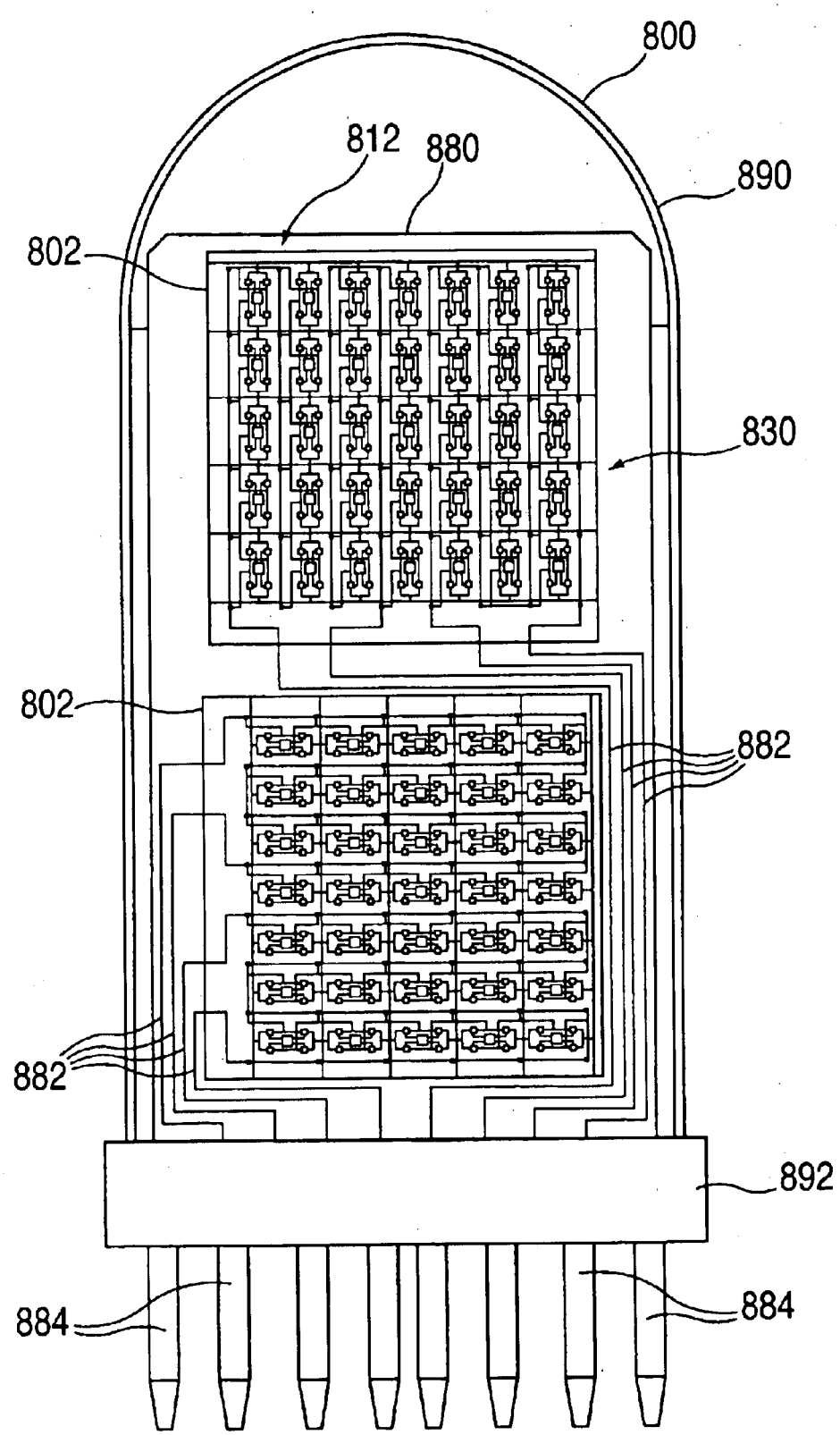
FIG. 25 is a cross-sectional plan view of the portion of the nanotube electromechanical system of FIG. 24 taken along line 25—25.
Figure 26:
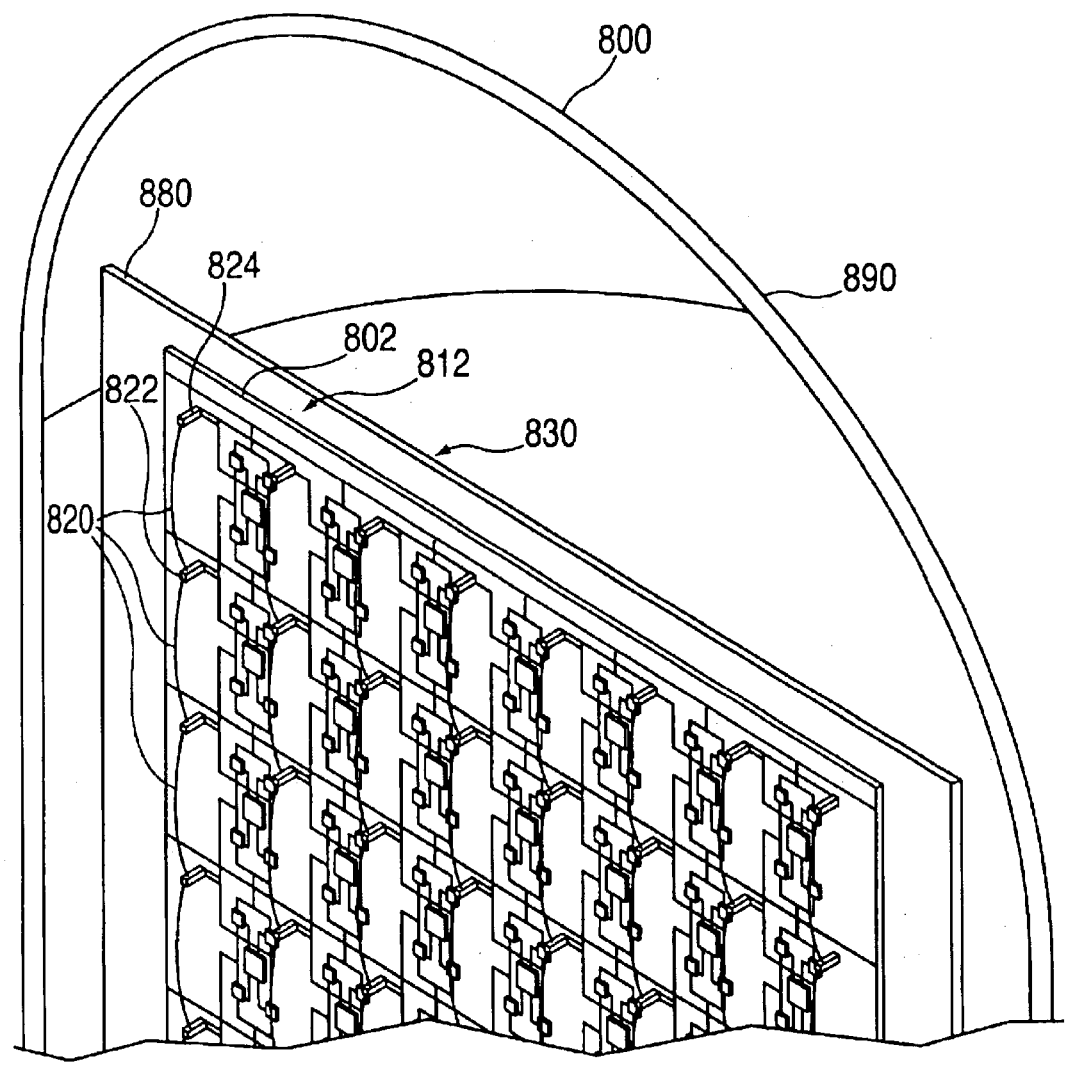
FIG. 26 is a close-up perspective view of a portion of the nanotube electromechanical system of FIG. 24 for illustrative purposes.

FIGS. 24 through 26 show an additional alternate embodiment of a nanotube electromechanical assembly 800 constructed in accordance with the principles of the present invention. Assembly 800 is also based on multiple instances of an electromagnetically coupled suspended nanotube with the principles discussed above and accordingly, the same numbering scheme applies here as well; e.g., nanotubes 820 are substantially similar to nanotubes 120, and therefore, the earlier discussion above also applies to nanotubes 820.

Nanotube assembly 800 includes a base circuit board 880, to which two substrate-based assemblies 802 are mounted. Each of assemblies 802 includes thirty-five electromagnetically coupled nanotube assemblies, each of which includes a suspended nanotube 820 mounted between posts 822 and 824. Assemblies 802 also include control/driver electronics 830, which includes four transistors configured as previously shown and described with respect to assemblies 100–700. Also as previously described, if unidirectional rotation is sufficient for the application, the control/driver electronics may be reduced to two or one transistor for each nanotube in the assembly. Similarly, if synchronous action is desired from one or more nanotubes, a single instance of control/driver electronics can connect to the array of nanotube assemblies.

Each of the two instances of assembly 802 also includes four wire traces 882 that provide an interface between assembly 802 and other external circuitry, such as control logic circuitry or monitoring circuitry. Wire traces 882 are routed along circuit board 880 and connected to output pins 884. Nanotube assembly 800 also includes a housing 890 that, in conjunction with base 892, permits circuit board 880 to be placed in a vacuum environment. This vacuum environment is advantageous because it reduces aerodynamic drag on the rapidly spinning or vibrating nanotubes, thereby increasing efficiency for many applications Nanotube assembly 800 may be used in a wide variety of applications and simply illustrates one embodiment for constructing a large array of electromagnetically coupled nanotube devices. For example, as previously described, assembly 800 may be used as an electromagnetic transmitter and/receiver, or it may be used to measure or generate magnetic fields. Alternatively, this assembly may be used to store energy as kinetic energy of the spinning nanotubes, which may then be discharge as electrical energy as desired. Assembly 800 may be used as a gyroscope or accelerometer because if external acceleration is present, spinning nanotubes 820 will flex and provide a voltage distinguishable from those instances in which no acceleration is present. Nanotube assembly 800 may also be utilized to sense magnetic fields.

Figure 27:
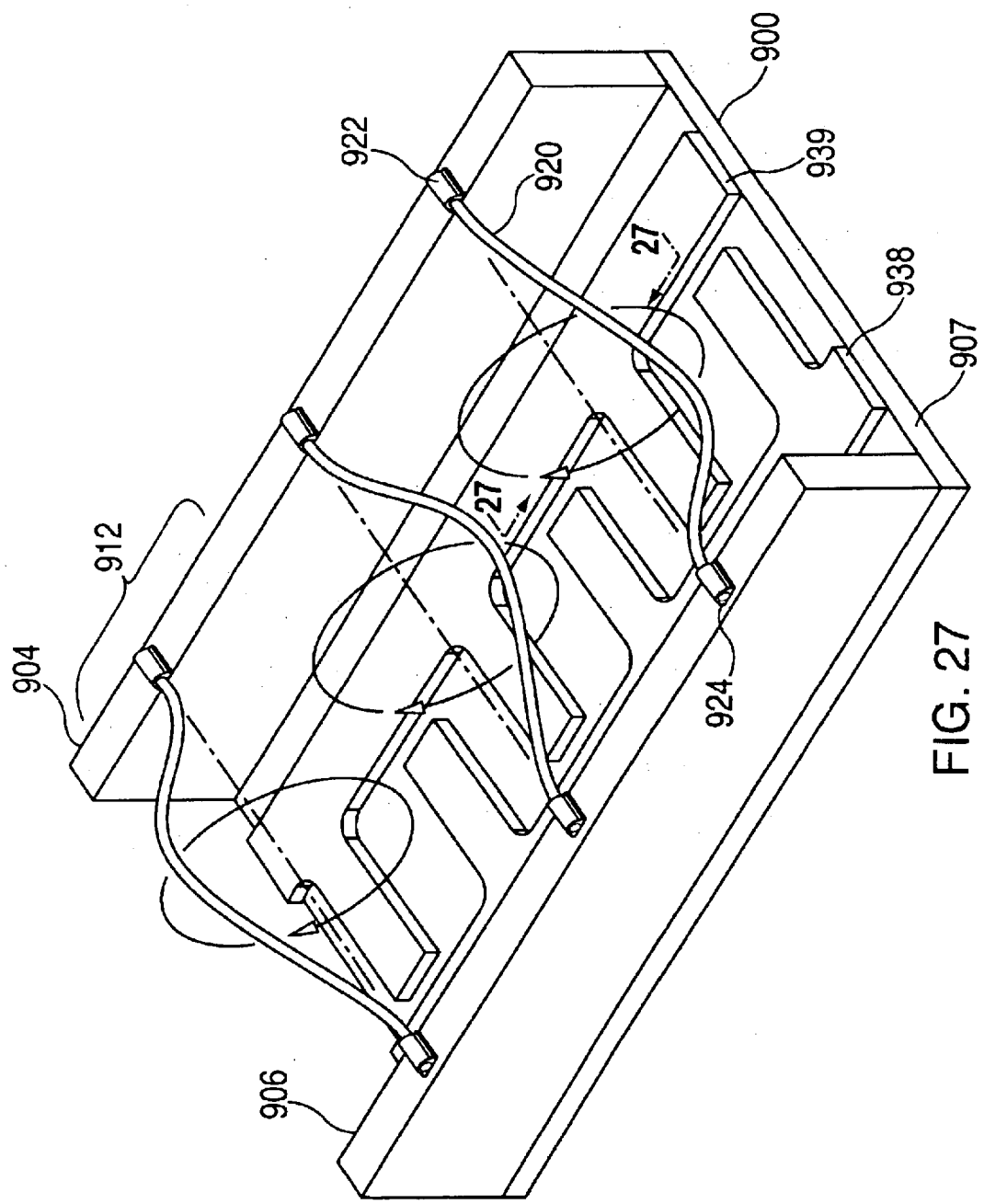
FIG. 27 is a perspective view of a portion of another nanotube electromechanical system constructed in accordance with the present invention.

FIG. 27 shows an additional alternate embodiment of a nanotube electromechanical assembly 900 constructed in accordance with the principles of the present invention. Assembly 900 is based on multiple instances of an electrostatically coupled suspended nanotube of this invention. An electrostatically coupled nanotube assembly, such as those shown in FIG. 27, may be substituted in place of the electromagnetically coupled nanotube assemblies, by removing the magnetic field and adding structures for applying the electrostatic potential. The portion shown in FIG. 27 includes a lower substrate base 902, channel side walls 904 and 906, three nanotube assemblies 912, and two conductive surfaces 938 and 939 attached to base 902. For clarity, only one of the three nanotube assemblies of FIG. 27 is labeled, however the description applies to each of them equally. In this assembly, the conductive surfaces 938 and 939 are electrically connected to the corresponding pad of the neighboring assembly. Pads 922 and 924 are mounted to channel side walls 904 and 906, which may contain a conductive element to electrically interconnect nanotubes 920 or may be conductive itself.

The ends of each nanotube 920 are mounted, respectively, to one of the pads 922 and 924. It may be preferable to include some slack in nanotube 920 so that it hangs like a jump rope as shown. Alternatively, it may be preferable to mount nanotube 920 across pads 922 and 924 such that there is some tension between pads 922 and 924, in which case, the device would take advantage of the vibration of the nanotube rather than the rotation, or would take advantage of a smaller rotational amplitude at a higher frequency than a nanotube with lower tension. Alternatively, it may be preferable to mount nanotube 920 across pads 922 and 924 such that one or more of said pads is on a flexible member, in which case, the ends of the nanotube would become drawn closer together as the tension in the nanotube is increased at high rotational speeds; thereby allowing higher amplitudes and higher energies that one could obtain using a nanotube which was mounted with no slack to rigidly positioned pads.

Each of nanotubes 920 may, for example, be constructed of a material such as carbon; an example being a single walled carbon nanotube (a tubular fullerene) having a diameter of approximately 1 to 20 nanometers and a length from 20 to hundreds of nanometers (persons skilled in the art will appreciate that the dimensions of nanotubes 120 may be varied without departing from the spirit of the present invention). One advantage in using single walled carbon nanotubes for nanotubes 920 is that they are formed of a single molecule. Therefore, they may be bent endlessly at will within dimensional limits without damaging them, and without losing a lot of energy to friction. A further advantage of using single walled carbon nanotubes for nanotubes 920 is that the tensile strength is very high, allowing high vibrational and rotational energies. Another further advantage of using single walled carbon nanotubes for nanotubes 920 is the high electrical conductivity of these nanotubes. Alternatively, each of members 920 may be another suitable structure which is not a single molecule, such as, but not limited to, a carbon filament, a multiwalled carbon nanotube, or simply an electrically conductive, flexible piece of wire. Alternatively, the nanotube may be any of many other suitable molecular structures, including, but not limited to, tubular boron carbide molecules, tubular carbon nitride molecules or a single crystal filament such as quartz. In addition, it may be preferable to bond other molecular structures at one or more points along the primary nanotube or molecular wire to increase the mass or the cross-sectional size of the rotating element.

Control/driver electronics are not shown, but may be affixed to the opposite side of substrate base 902 or may be external to the assembly. These control/driver electronics are substantially similar to those shown previously, except that these control/driver electronics are connected to fixed conductive surfaces 938 and 939. All suspended nanotubes are connected to a DC voltage. The control/driver electronics provide pulsed DC or AC voltage to the fixed conductive surfaces 938 and 939, which causes the nanotubes 920 to rotate due to electrostatic forces between said surfaces and the nanotube. Similarly, the fixed conductive surfaces may be attached to different static voltages while the control/driver electronics applies a pulsed DC or AC voltage to the suspended nanotubes, thereby obtaining similar electrostatic forces and similar motion from the nanotube. The electrostatic forces and resulting motion are illustrated in the following figures.

Figure 28:
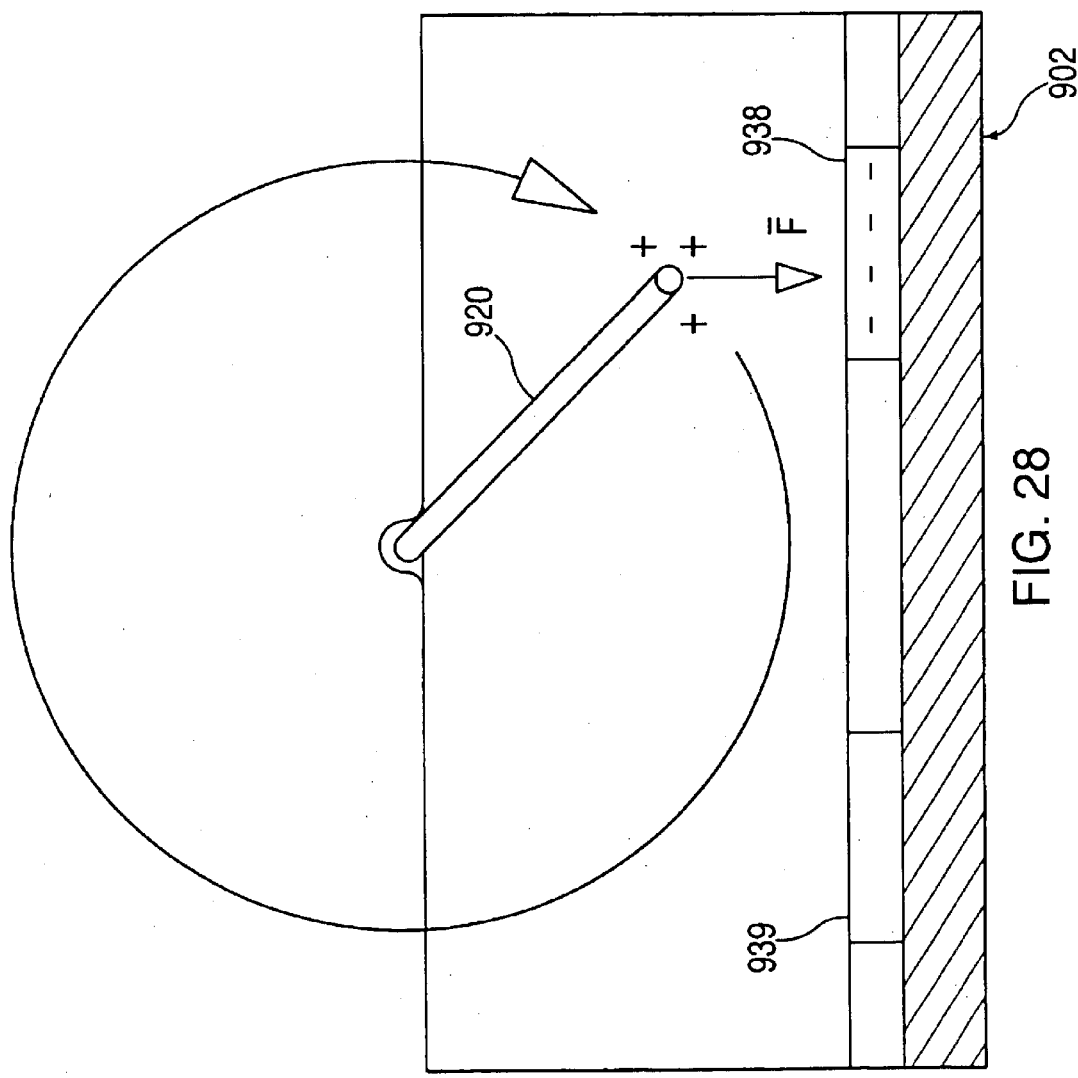
FIG. 28 is a cross-sectional plan view of the portion of the nanotube electromechanical system of FIG. 27 taken along line 27—27.

For example of these electrostatic forces, FIG. 28 shows a view of one of the nanotube assemblies 912 from FIG. 27, as viewed along the axis of the nanotube 920. FIG. 28 indicates a fixed conductive surface 938 that has a voltage, or charge, which is negative with respect to the voltage, or charge, on suspended nanotube 920. The minus and plus signs on these elements indicate the difference in electrical potential. The resulting electrostatic attractive force between these elements is indicated with the force vector, F. This resulting force causes the nanotube to move toward the fixed conductive surface 938.

Figure 29:
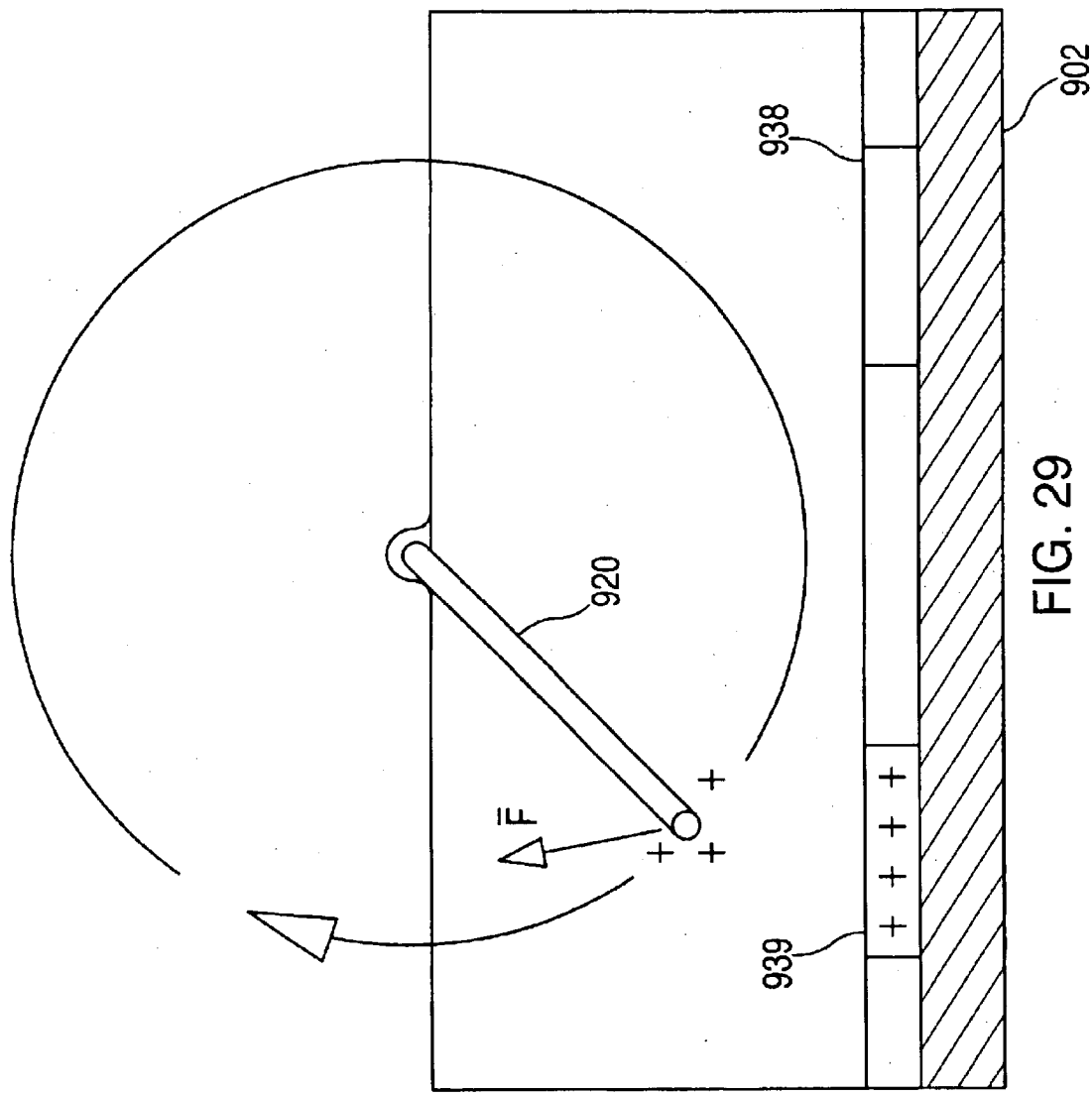
FIG. 29 is another cross-sectional plan view of the portion of the nanotube electromechanical system of FIG. 27 taken along line 27—27.

FIG. 29 again shows a view of one of the nanotube assemblies 912 from FIG. 27, as viewed along the axis of the nanotube 920. FIG. 29 indicates a fixed conductive surface 939 that has a voltage, or charge, which is the same as the voltage, or charge, on suspended nanotube 920. The plus signs on these elements indicate that the electrical potential is the same. The resulting electrostatic repulsive force between these elements is indicated with the force vector, F. This resulting force causes nanotube 920 to move away from the fixed conductive surface 939.

Figure 30:
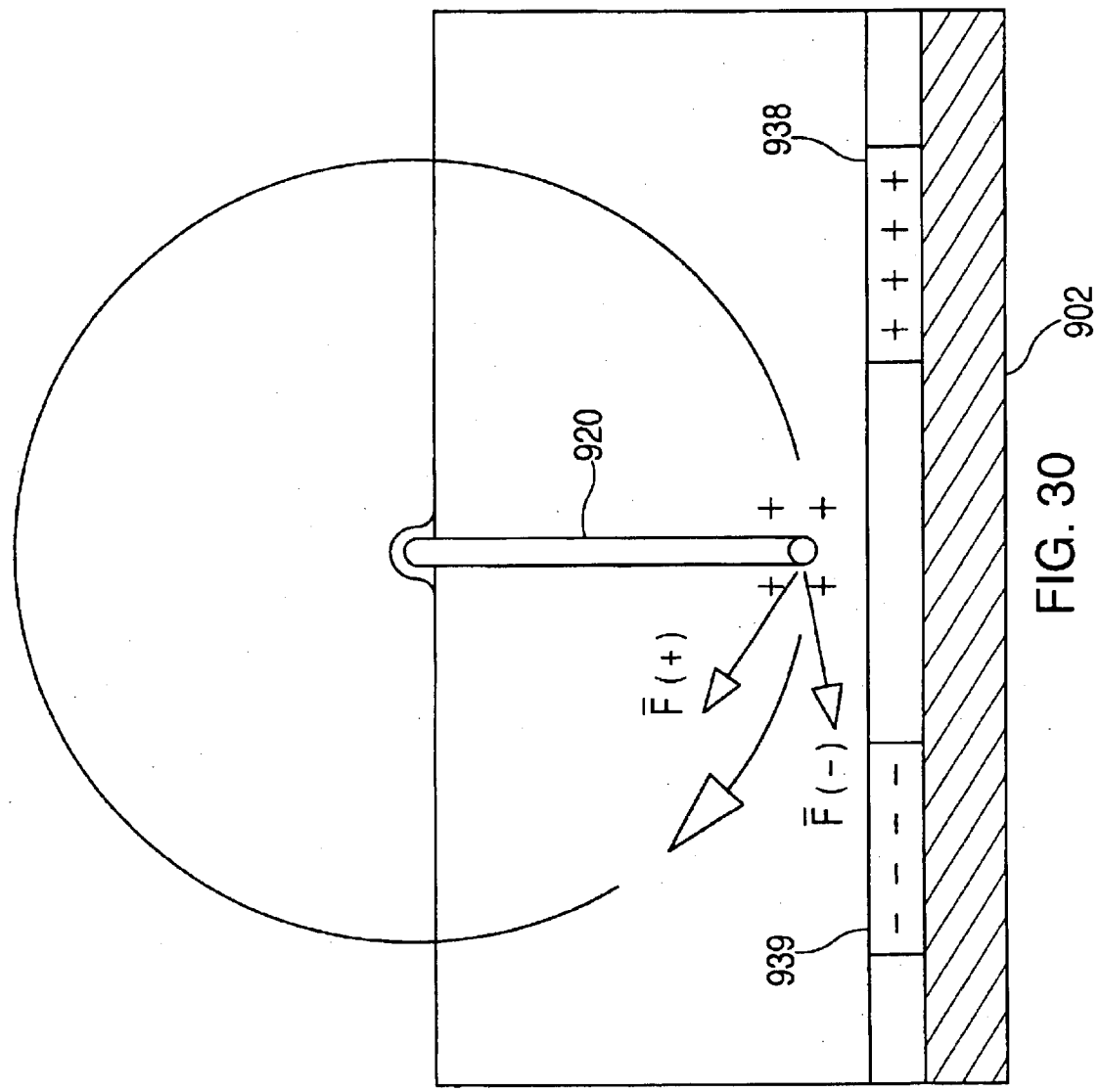
FIG. 30 is another cross-sectional plan view of the portion of the nanotube electromechanical system of FIG. 27 taken along line 27—27.

FIG. 30 again shows a view of one of the nanotube assemblies 912 from FIG. 27, as viewed along the axis of the nanotube 920, showing how the effects of both fixed conductive surfaces 938 and 939 can be used to move the nanotube. FIG. 30 indicates a fixed conductive surface 938 that has a voltage, or charge, which is the same as the voltage, or charge, on suspended nanotube 920, and a fixed conductive surface 939 that has a voltage, or charge, which is negative with respect to the voltage, or charge, on suspended nanotube 920. The resulting electrostatic forces applied on the nanotube by these charged plates are indicated with the force vectors, F(+) and F(−). The resulting combined force causes nanotube 920 to move away from the fixed conductive surface 938 and toward fixed conductive surface 939.

Figure 31:
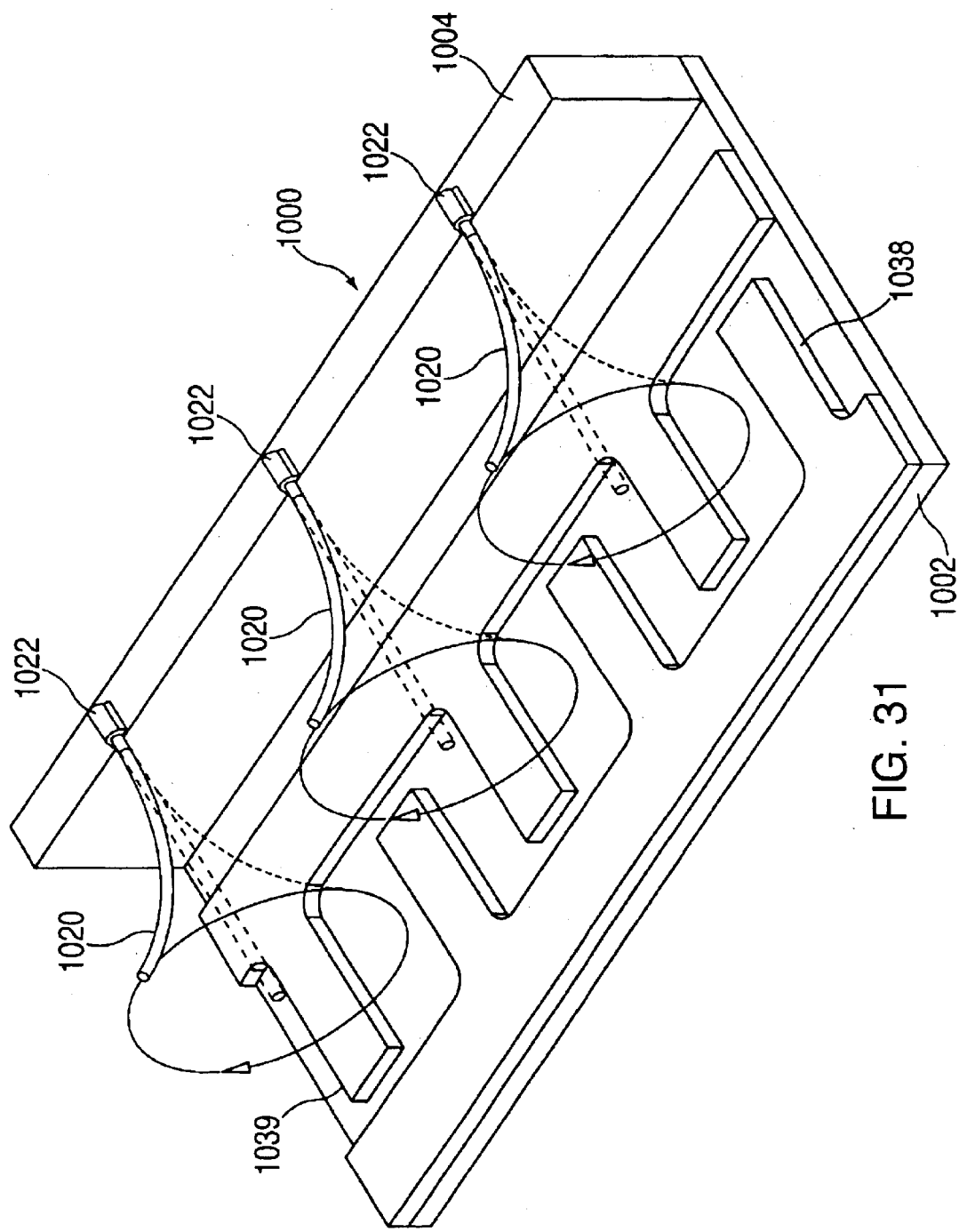
FIG. 31 is a perspective view of a portion of another nanotube electromechanical system constructed in accordance with the present invention.

FIG. 31 shows an additional alternate embodiment of a nanotube electromechanical assembly 1000 constructed in accordance with the principles of the present invention. Assembly 1000 is based on multiple instances of an electrostatically coupled suspended nanotube. The portion shown in FIG. 31 includes a lower substrate base 1002, channel side wall 1004, three nanotube assemblies 1020, and two conductive surfaces 1038 and 1039 attached to base 1002. Pad 1022 is mounted to channel side wall 1004, which may contain a conductive element to electrically interconnect nanotubes 1020 to external circuitry or may be conductive itself.

The assembly 1000 in FIG. 31 differs from the assembly in FIG. 27 in that only one end of the nanotube is fixed. FIG. 31 shows one end of each nanotube 1020 mounted to pads 1022, such that the nanotube is suspended parallel to substrate base. All other components of FIG. 31 are the same as in FIG. 27, such that similar electrostatic forces can be applied to the nanotubes 1020 by controlling voltage pulses as described above. Accordingly, FIGS. 28–30 and the descriptions of FIGS. 28–30 apply equally well to the behavior of assembly 1000 of FIG. 31.

Figure 32:
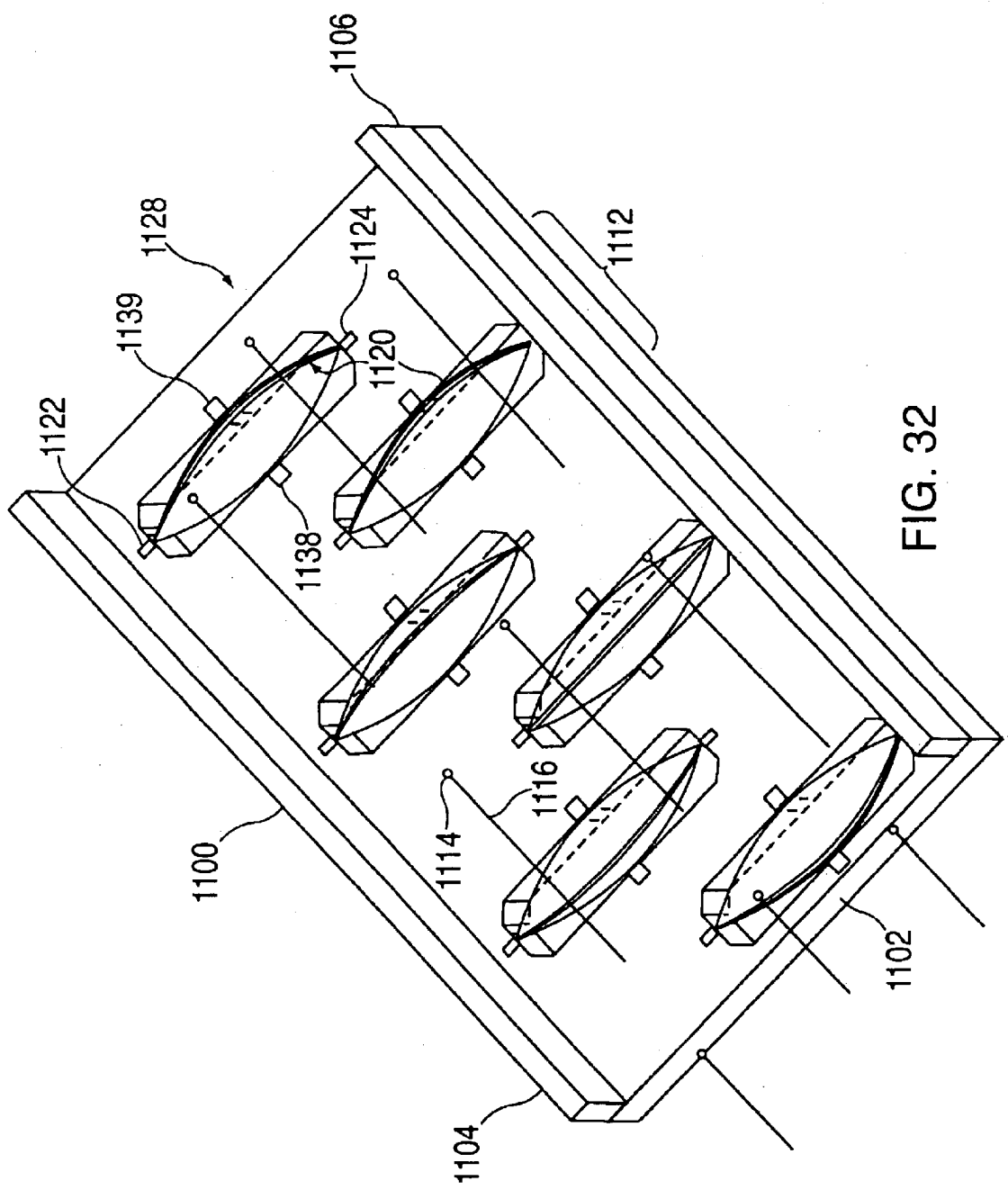
FIG. 32 is a perspective view of a portion of another nanotube electromechanical system constructed in accordance with the present invention.

FIG. 32 shows an additional alternate embodiment of a nanotube electromechanical assembly 1100 constructed in accordance with the principles of the present invention. Assembly 1100 is based on multiple instances of an electrostatically coupled suspended nanotube, but shows these electrostatically coupled nanotube assemblies substituted in place of the electromagnetically coupled nanotube assemblies in assembly 100, by removing the magnetic field and adding structures for applying the electrostatic potential.

FIG. 32 shows six individual electrostatically coupled nanotube assemblies 1112 on a single substrate base 1102. Each nanotube assembly is again comprised of suspended nanotubes 1120 mounted between two end connections 1122 and 1124. As in assembly 100, the nanotubes are again suspended across troughs, such that the lower half of the nanotubes rotational travel is inside the trough. Fixed conductive surfaces 1138 and 1139 are attached to the side walls of each trough, with these conductive surfaces having electrical connections through the substrate 1102 to control/driver electronics on the other side. Side walls 1104 and 1106 are attached to the substrate base 1102, and a top substrate (not shown) would be attached to the top of these walls, such that the working substance is constrained to a central channel.

The fixed conductive surfaces are placed such that electrostatic forces can be applied to the nanotube from either side. In this configuration, the control/driver electronics would alternately apply voltage pulses to the two conductive surfaces, resulting in alternating forces which would drive the nanotubes to rotate in a clockwise direction (similar to the operation of FIGS. 28–30). Impacts from these rotating elements would thereby force the molecules of the working fluid to travel from left to right across FIG. 32, so that they are pumped through the channel at end 1128. For purposes of illustration, molecule 1114 and indicator 1116 are intended to show the present position of molecule 1114 and the path 1116 it has taken to reach that location. These six nanotube assemblies 1112 may be driven independently by providing a set of transistor control elements for each fixed conductive surface, or these six assemblies may be controlled together in a synchronized manner by interconnecting pads 1138 of each assembly and pads 1139 of each assembly while providing only one set of transistor control elements for all six nanotube assemblies 1112.

Assembly 1100 could be used for any of the assemblies shown previously which contain assemblies similar to assembly 100. Applications for these assemblies may include, for example, compressors, fans, turbine-like generators, heat engines, vacuum pumps, propulsion systems, magnetic field sensors, magnetic field generators, gyroscopes and kinetic energy storage devices, as previously described. Furthermore, additional molecules could be bonded to a nanotube of the present invention. Doing so may, for example, increase the cross section or inertia of the nanotube. Depending on the application, such characteristics could be advantageously utilized. For example, a large cross section may be desirable for pump applications while a large inertia may be desired in energy storage applications.

Persons skilled in the art will appreciate that two components do not have to be connected or coupled together in order for these two components to electrically interact with each other. Thus, persons skilled in the art will appreciate that two components are electrically coupled together, at least for the sake of the present application, when one component electrically affects the other component. Electrical coupling may include, for example, physical connection or coupling between two components such that one component electrically affects the other, capacitive coupling, electromagnetic coupling, free charge flow between two conductors separated by a gap (e.g., vacuum tubes), and inductive coupling.

Additional advantageous nanometer-scale electromechanical assemblies are described in commonly assigned copending U.S. patent application Ser. No. 10/453,783 to Pinkerton et. al, entitled "Nanoelectromechanical Transistors and Switch Systems," commonly assigned copending U.S. patent application Ser. No. 10/453,199 to Pinkerton et. al, entitled "Nanoelectromechanical Memory Cells and Data Storage Devices," and commonly assigned copending U.S. patent application Ser. No. 10/453,373 to Pinkerton et. al, entitled "Energy Conversion Systems Utilizing Parallel Array of Automatic Switches and Generators," which are all hereby incorporated by reference in their entirely and filed on the same day herewith.

From the foregoing description, persons skilled in the art will recognize that this invention provides nanometer-scale and micrometer scale electromechanical assemblies that may be utilized as, for example, motors, generators, pumps, fans, compressors, propulsion systems, transmitters, receivers, heat engines, heat pumps, magnetic field sensors, magnetic field generators, inertial energy storage and acoustic energy conversion. In addition, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed assemblies and methods, but is intended to include variations to and modifications therefrom which are within the spirit of the following claims.

What is claimed is:

1. An assembly immersed in a working substance having a plurality of molecules comprising:

a base member;

a magnetic field;

a first nanometer-scale beam fixed at both ends to said base member, wherein a middle portion of said first beam is free-to-move, said first beam is immersed in said magnetic field, a time-varying electrical current flows through said first beam, electromagnetic interactions between said first beam and said magnetic field cause motion of said first beam relative to said base member, and said motion changes the average velocity of at least a few of said plurality of molecules along a desired direction; and switching circuitry coupled to at least one of said both ends that provides said time-varying electrical current, a second nanometer-scale beam fixed to said base member, wherein said second nanometer-scale beam has a second portion that is free-to-move; and a channel having an input opening and an output opening, wherein said first and second beams are located in said channel between said input and output openings, wherein said direction is along a line from said input opening to said output opening.

2. The system of claim 1, wherein energy is drawn from an external source to accelerate said first beam.

3. The system of claim 1, wherein kinetic energy is transferred from at least a few of said plurality of molecules to said first beam.

4. The system of claim 1, wherein said motion is periodic.

5. The system of claim 1, wherein said first beam is located near a trough.

6. The system of claim 5, wherein the trajectory of said motion passes through, at least in part, said trough.

7. The system of claim 6, wherein said the trajectory of said motion passes through, at least in part, the outside of said trough.

8. The system of claim 7, wherein the trajectory of said motion located outside of said trough is substantially in said desired direction.

9. An assembly immersed in a working substance having a plurality of molecules comprising:

a base member;

a magnetic field;

a first nanometer-scale beam fixed at both ends to said based member, wherein a middle portion of said first beam is free-to-move, said first beam is immersed in said magnetic field, a time-varying electrical current flows through said first beam, electromagnetic interactions between said first beam and said magnetic field cause motion of said first beam relative to said base member, and said motion changes the average velocity of at least a few of said plurality of molecules along a desired direction; and switching circuitry coupled to at least one of said both ends that provides said time-varying electrical current; and an aperture located in said base member, wherein said first beam is located near said aperture.

10. The system of claim 9, wherein at least a few of said plurality of molecules are accelerated through said aperture when impacted by said first beam.

11. The system of claim 9, wherein at least a few of said plurality of molecules are directed away from said aperture when impacted by said first beam.

12. An assembly comprising:

a base member;

a static magnetic field;

switching circuitry; and a nanometer-scale beam carrying a substantially static electric charge, wherein said nanometer-scale beam is immersed in said static magnetic field and fixed to said base member at both ends such that a middle portion of said beam is free-to-move, wherein at least one of said both ends is coupled to said switching circuitry, said switching circuitry causing a time-varying electrical current to flow through said beam, and electromagnetic interactions between said beam and said magnetic field cause motion in said free-moving portion, wherein the trajectory of said motion is elliptical.

13. The system of claim 12, wherein said motion generates electromagnetic signals.

14. The system of claim 13, wherein said sense circuitry senses changes in said motion due to electromagnetic signals.

15. The system of claim 12 further comprising:

sense circuitry for sensing said motion of said beam.

16. An assembly immersed in a working substance having a plurality of molecules comprising:

a base member;

a magnetic field;

a first nanometer-scale beam fixed at both ends to said based member, wherein a middle portion of said first beam is free-to-move, said first beam is immersed in said magnetic field, a time-varying electrical current flows through said first beam, electromagnetic interactions between said first beam and said magnetic field cause motion of said first beam relative to said base member, and said motion changes the average velocity of at least a few of said plurality of molecules along a desired direction; and switching circuitry coupled to at least one of said both ends that provides said time-varying electrical current, wherein the trajectory of said motion is elliptical.

17. An assembly immersed in a working substance having a plurality of molecules comprising:

a base member;

a magnetic field;

a first nanometer-scale beam fixed at both ends to said based member, wherein a middle portion of said first beam is free-to-move, said first beam is immersed in said magnetic field, a time-varying electrical current flows through said first beam, electromagnetic interactions between said first beam and said magnetic field cause motion of said first beam relative to said base member, and said motion changes the average velocity of at least a few of said plurality of molecules along a desired direction; and switching circuitry coupled to at least one of said both ends that provides said time-varying electrical current, wherein the trajectory of said motion is substantially circular.

18. As assembly comprising:

a base member;

a magnetic field;

a vacuum housing;

a first nanometer-scale beam having both ends fixed to said base member, wherein a portion of said first beam between said both ends is free-to-move, said beam is immersed in said magnetic field, at least said first beam is located in said vacuum housing, and electromagnetic interactions between said beam and said magnetic field cause motion in said free-moving portion;

switching circuitry coupled to at least one of said both ends, wherein a time-varying electrical current flows through said first beam and said switching circuitry; and sense circuitry that senses said motion of said free-moving portion, wherein the trajectory of said motion is substantially circular.

19. As assembly comprising:
a base member;
a magnetic field;
a vacuum housing;
a first nanometer-scale beam having both ends fixed to said base member, wherein a portion of said first beam between said both ends is free-to-move, said beam is immersed in said magnetic field, at least said first beam is located in said vacuum housing, and electromagnetic interactions between said beam and said magnetic field cause motion in said free-moving portion;
switching circuitry coupled to at least one of said both ends, wherein a time-varying electrical current flows through said first beam and said switching circuitry; and
sense circuitry that senses said motion of said free-moving portion, wherein the trajectory of said motion is elliptical.

20. The system of claim 19, wherein energy is drawn from an external source to accelerate said beam.

21. The system of claim 19, further comprising:
a second nanometer-scale beam mounted on said base member.

22. The system of claim 19 wherein said motion is periodic.

23. The system of claim 19, wherein said motion of said free-moving portion is utilized to generate time-varying electromagnetic signals.

24. The system of claim 19, wherein said motion of said free-moving portion is utilized to store kinetic energy.

25. The system of claim 19, further comprising:
sense circuitry for detecting time-varying electromagnetic signals.

26. The system of claim 19, further comprising:
sense circuitry for detecting the acceleration of said base member.

27. The system of claim 19, further comprising:
sense circuitry for detecting substantially static magnetic fields.

28. An assembly that is immersed in a working substance having a plurality of molecules comprising:
a lower substrate base;
a source of an external magnetic field;
a plurality of nanometer-scale sub-assemblies, each one of said nanometer-scale sub-assemblies comprising:
a first electrically conductive connection pad;
a second electrically conductive connection pad;
an electrically conductive and mechanically flexible nanometer-scale suspension member suspended between said first and second connection pads; and
control/driver circuitry coupled to said first and second connection pads, said control/driver circuitry being operable to provide a time-varying current to said suspension member to cuase said suspension member to move, wherein the trajectory of the motion of said suspension member is elliptical.

29. The assembly of claim 28 wherein each one of said suspension members of said plurality of subassemblies is a nanotube.

30. The assembly of claim 28, further comprising:
an upper substrate spaced apart from and substantially parallel to said lower substrate; and
first and second channel side walls spaced apart from and substantially parallel to each other, said upper and lower substrates and said first and second channel side walls being arranged with respect to each other to form a channel having first and second opening at each end.

31. The nanometer-scale assembly of claim 30, wherein said lower substrate base comprises a plurality of troughs, each of said plurality of sub-assemblies being configured such that each one of said suspension members is suspended in said trough.

32. The assembly of claim 31, wherein said control/driver circuitry is fabricated on one side of said lower substrate base and said troughs are located on the opposite side.

33. The assembly of claim 31, wherein said troughs are arranged in a staggered manner such that no two sequential troughs, going from one end of said channel to the other, are aligned together.

34. The assembly of claim 28, wherein said control/driver circuitry coupled to each pair of said first and second connection pads comprise circuitry capable of causing said suspension member to rotate clockwise or counter-clockwise.

35. The assembly of claim 28, wherein said control/driver circuitry coupled to each pair of said first and second connection pads comprises four transistors.

36. The assembly of claim 35, wherein two of said four transistors are coupled to said first connection pad and two of said four transistors are coupled to said second connection pad.

37. The assembly of claim 28, wherein said control/driver circuitry coupled to each pair of said first and second connection pads comprises circuitry capable of causing said suspension member to rotate in only one direction.

38. An assembly that is immersed in a working substance having a plurality of molecules comprising:
a magnetic field generator;
a chamber having an upper substrate surface which has a plurality of slotted openings; and
a subassembly formed on said upper substrate surface comprising a plurality of nanotubes, each of which is suspended between a pair of connection pads, each pair of connection pads being coupled to control/driver circuitry that applies current pulses to said nanotubes and causes said nanotubes to rotate when said nanotubes are exposed to magnetic fields created by said magnetic field generator, each of said nanotubes being aligned with one of said slotted openings.

39. The assembly of claim 38, wherein said magnetic field generator comprises at least one permanent magnet.

40. The assembly of claim 38, wherein said magnetic field generator comprises at least one electromagnet.

41. The assembly of claim 38, wherein said control/driver circuitry is configured to rotate said nanotubes clockwise or counter-clockwise through magnetic field provided by said magnetic field generator.

42. The assembly of claim 38, wherein said control/driver circuitry is configured to rotate said nanotubes in a single direction.

43. The assembly of claim 38, wherein rotation of said nanotubes creates at least a partial vacuum that pulls said working substance from said chamber through said slotted openings.

44. An assembly that is immersed in a working substance having a plurality of molecules comprising:
a source of magnetic field;
a substrate base;
a plurality of first and second connection pads mounted to said base;

a plurality of nanotubes mounted between a different set of first and second connection pads, such that said nanotubes are electrically coupled to said pads, and such that said nanotubes are suspended between said pads; and control driver circuitry that is electrically connected to said first and second mounted pads to provide current pulses to said plurality of nanotubes to cause said plurality of nanotubes to move, wherein the trajectory of the motion of said nanotubes is elliptical.

45. The assembly of claim 44 wherein said nanotubes are vibrated by said current pulses from said control/driver circuitry.

46. The assembly of claim 44, further comprising:

a voltage generator that applies electric charge to each of said plurality of nanotubes, said assembly operating as an electromagnetic receiver by sensing motion induced by electromagnetic radiation on said nanotubes.

47. The assembly of claim 44, wherein said plurality of nanotubes and said control/driver circuitry are formed on a first surface of said substrate base.

48. The assembly of claim 44, wherein said plurality of suspended electrically conductive members and said control driver/circuitry are formed on opposite surfaces of said substrate base.

49. The assembly of claim 44, wherein each of said plurality of nanotubes is located within a trough formed in said substrate base.

50. An assembly that is immersed in a working substance having a plurality of molecules comprising:

a source of magnetic field;

a substrate base;

a plurality of first and second connection pads mounted to said base;

a plurality of nanotubes mounted between a different set of first and second connection pads, such that said nanotubes are electrically coupled to said pads, and such that said nanotubes are suspended between said pads; and control driver circuitry that is electrically connected to said first and second mounted pads to provide current pulses to said plurality of nanotubes to cause said plurality of nanotubes; and a voltage generator that applies electric charge to each of said plurality of nanotubes, said assembly operating as an electromagnetic transmitter based on the ortation of said nanotubes.

51. An assembly that is immersed in a working substance having a plurality of molecules comprising:

a source of magnetic field;

a substrate base;

a plurality of first and second connection pads mounted to said base;

a plurality of nanotubes mounted between a different set of first and second connection pads, such that said nanotubes are electrically coupled to said pads, and such that said nanotubes are suspended between said pads; and control driver circuitry that is electrically connected to said first and second mounted pads to provide current pulses to said plurality of nanotubes to cause said plurality of nanotubes wherein said plurality of nanotubes are rotated at high speeds such that said plurality of nanotubes impact molecules of said working substance and drive at least a portion of said molecules into said substrate base, said impact resulting in a net force that causes said substrate base to be propelled.

52. A heat engine, said heat engine comprising:

a source of thermal energy;

a working substance;

control/driver circuitry;

a source of magnetic field;

a first and second assembly, wherein each one of said first and second assemblies comprises:
 a base member;
 a first electrically conductive connection pad coupled to said base member;
 a second electrically conductive connection pad coupled to said base member;
 a nanotube suspended between said first and second connections pads that is provided a current by said control/driver circuitry;
 a channel, wherein a portion of said working substance is located in said channel and said nanotube interacts with molecules of said working substance; and a central chamber included between the channels of said first and second assemblies, such that said first assembly forces molecules of said working substance into said chamber and said forced molecules are heated by said thermal source.

53. A method of utilizing molecular level energy comprising:

applying a magnetic field to a nanotube assembly, said nanotube assembly comprising a plurality of nanotubes each of which are suspended between a pair of conductive connection pads;

immersing said assembly in a working substance; and applying current pulsed to said connection pads to cause said nanotubes to rotate.

54. The method of claim 53, wherein said rotating nanotubes impact and strike molecules of said working substance, thereby causing at least a portion of said molecules to impact a substrate, said action thereby propelling said assembly in a given direction.

55. The method of claim 53, wherein said rotating nanotubes cause molecules of said working substance to be accelerated such that said molecules travel along a channel in said assembly at higher speeds than said molecules would otherwise move.

* * * * *